United States Patent
Moore

(10) Patent No.: US 10,179,711 B1
(45) Date of Patent: Jan. 15, 2019

(54) PORTABLE LIFT APPARATUS FOR SHIPPING CONTAINERS

(71) Applicant: Michael T. Moore, Anaconda, MT (US)

(72) Inventor: Michael T. Moore, Anaconda, MT (US)

( * ) Notice: Subject to any disclaimer, the term of this patent is extended or adjusted under 35 U.S.C. 154(b) by 547 days.

(21) Appl. No.: 14/120,862

(22) Filed: Jul. 3, 2014

Related U.S. Application Data

(63) Continuation-in-part of application No. 13/694,045, filed on Oct. 22, 2012, now abandoned.

(60) Provisional application No. 61/627,911, filed on Oct. 21, 2011.

(51) Int. Cl.
*B60P 1/44* (2006.01)
*B65G 69/24* (2006.01)

(52) U.S. Cl.
CPC ............ *B65G 69/24* (2013.01); *B60P 1/4414* (2013.01)

(58) Field of Classification Search
CPC ......... B60P 1/44; B60P 1/4407; B60P 1/4414; B60P 1/4421; B60P 1/4428; B60P 1/4485
See application file for complete search history.

(56) References Cited

U.S. PATENT DOCUMENTS

| | | | | |
|---|---|---|---|---|
| 3,233,758 A | * | 2/1966 | Darfus | B60P 1/4442 414/540 |
| 4,087,007 A | * | 5/1978 | Drews | B60P 1/4421 414/545 |
| 4,452,555 A | * | 6/1984 | Calabro | B60P 1/6445 280/43.23 |
| 4,470,749 A | | 9/1984 | Koudstaal | |
| 4,474,527 A | * | 10/1984 | Risner | A61G 3/06 414/540 |
| 4,789,194 A | * | 12/1988 | Watson | B66C 1/663 294/81.53 |
| 4,930,969 A | * | 6/1990 | Langer | B60P 1/445 414/540 |
| 5,176,486 A | * | 1/1993 | Park | B60P 1/4421 296/51 |
| 5,201,626 A | | 4/1993 | Hansen | |
| 5,429,472 A | * | 7/1995 | Dahl | B65D 90/18 254/8 R |
| 5,513,943 A | * | 5/1996 | Lugash | B60P 1/4421 187/244 |
| 5,993,135 A | | 11/1999 | Wolgamood | |
| 6,234,740 B1 | | 5/2001 | Page | |

(Continued)

FOREIGN PATENT DOCUMENTS

GB 2 347 918 3/1999
WO WO 2013/082439 11/2012

*Primary Examiner* — Michael McCullough
*Assistant Examiner* — Ashley Romano
(74) *Attorney, Agent, or Firm* — Todd N. Hathaway

(57) ABSTRACT

A portable lift assembly that is temporarily mountable to the ends of standardized shipping containers, that allows cargo to be loaded and unloaded without a raised loading dock. The assembly includes a frame having pin members that engage standard corner castings on the access end of a shipping container so that the weight of the lift assembly and cargo are borne by the end of the container. Cargo is raised and lowered on a platform, with power being supplied from onboard the portable assembly. The portable assembly may be transported between containers and installed using a forklift or similar machine.

10 Claims, 27 Drawing Sheets

(56) References Cited

U.S. PATENT DOCUMENTS

| | | | | |
|---|---|---|---|---|
| 6,648,579 B2* | 11/2003 | Vartanian, Sr. | .......... | A61G 3/06 |
| | | | | 414/546 |
| 7,347,476 B2* | 3/2008 | Luehr | ...................... | B60J 5/108 |
| | | | | 296/146.8 |
| 7,419,204 B2* | 9/2008 | Coble | ...................... | B60P 1/435 |
| | | | | 296/146.9 |
| 7,573,221 B2* | 8/2009 | Rock | ................... | B60P 1/4471 |
| | | | | 318/283 |
| 7,806,647 B2* | 10/2010 | Gomes | ................. | B60P 1/4421 |
| | | | | 414/545 |
| 8,061,954 B2 | 11/2011 | Lambright | | |
| 9,028,195 B1* | 5/2015 | Heynssens | ............ | B60P 1/4428 |
| | | | | 414/545 |
| 9,616,796 B2* | 4/2017 | Russo | ................... | B60P 1/4421 |
| 2010/0225137 A1 | 9/2010 | Gunby | | |
| 2014/0314534 A1* | 10/2014 | Ablabutyan | .......... | B60P 1/4421 |
| | | | | 414/545 |

* cited by examiner

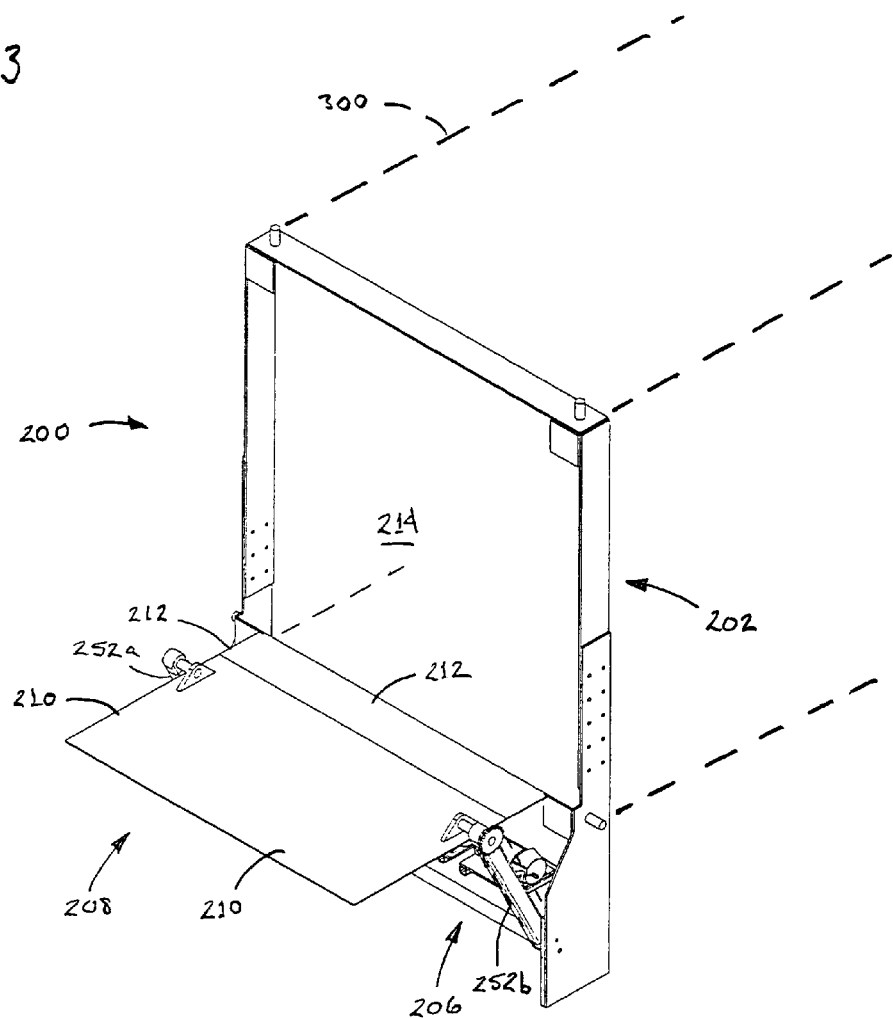

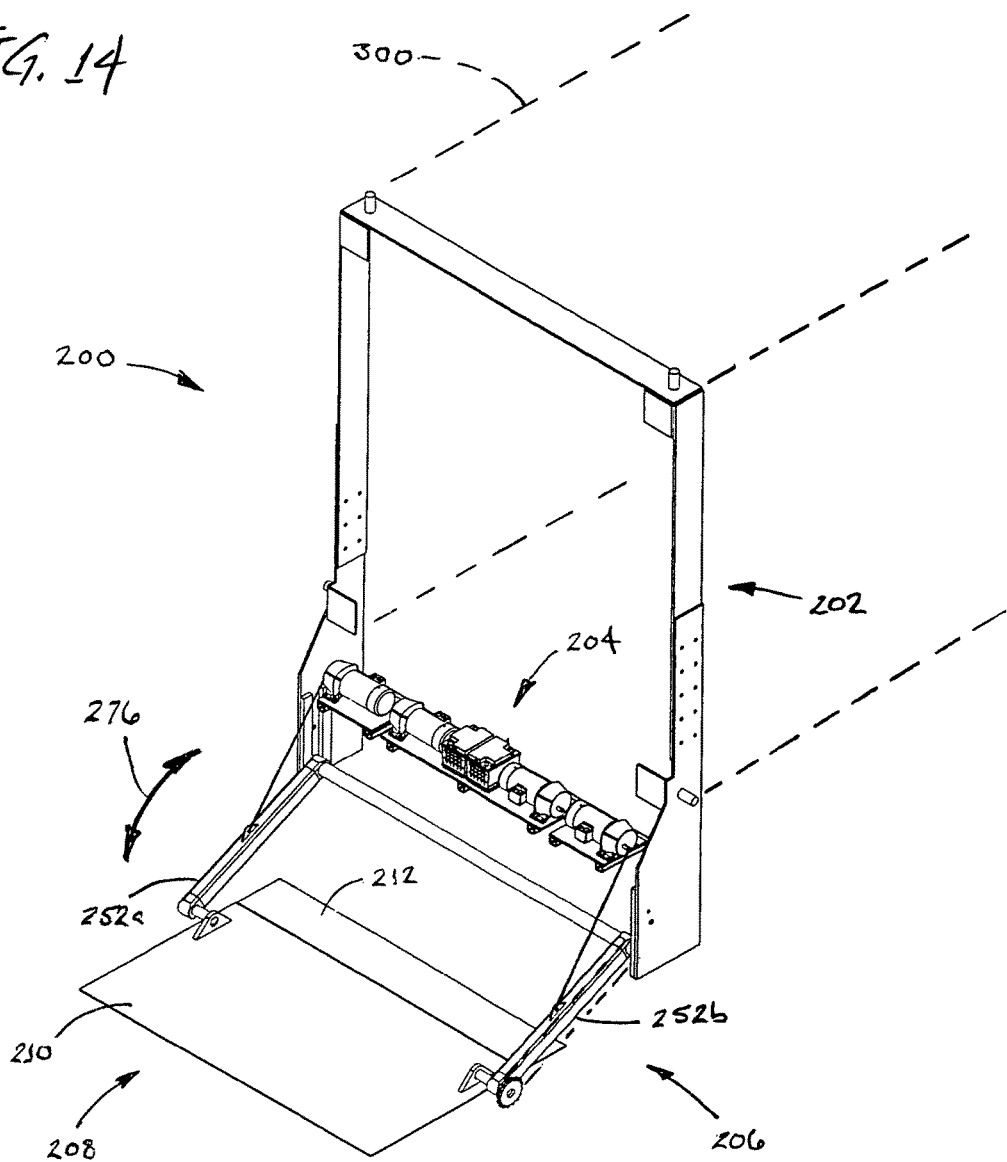

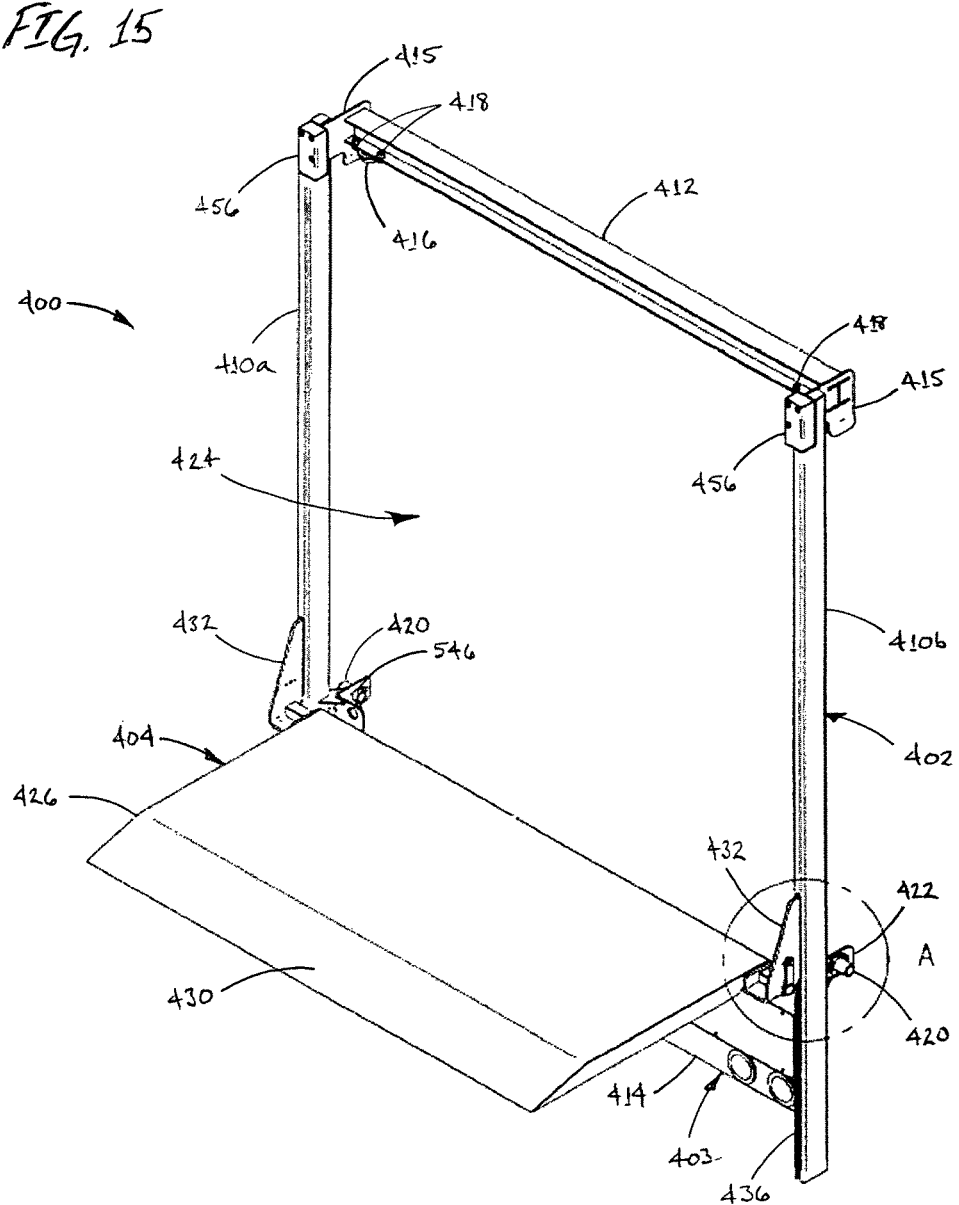

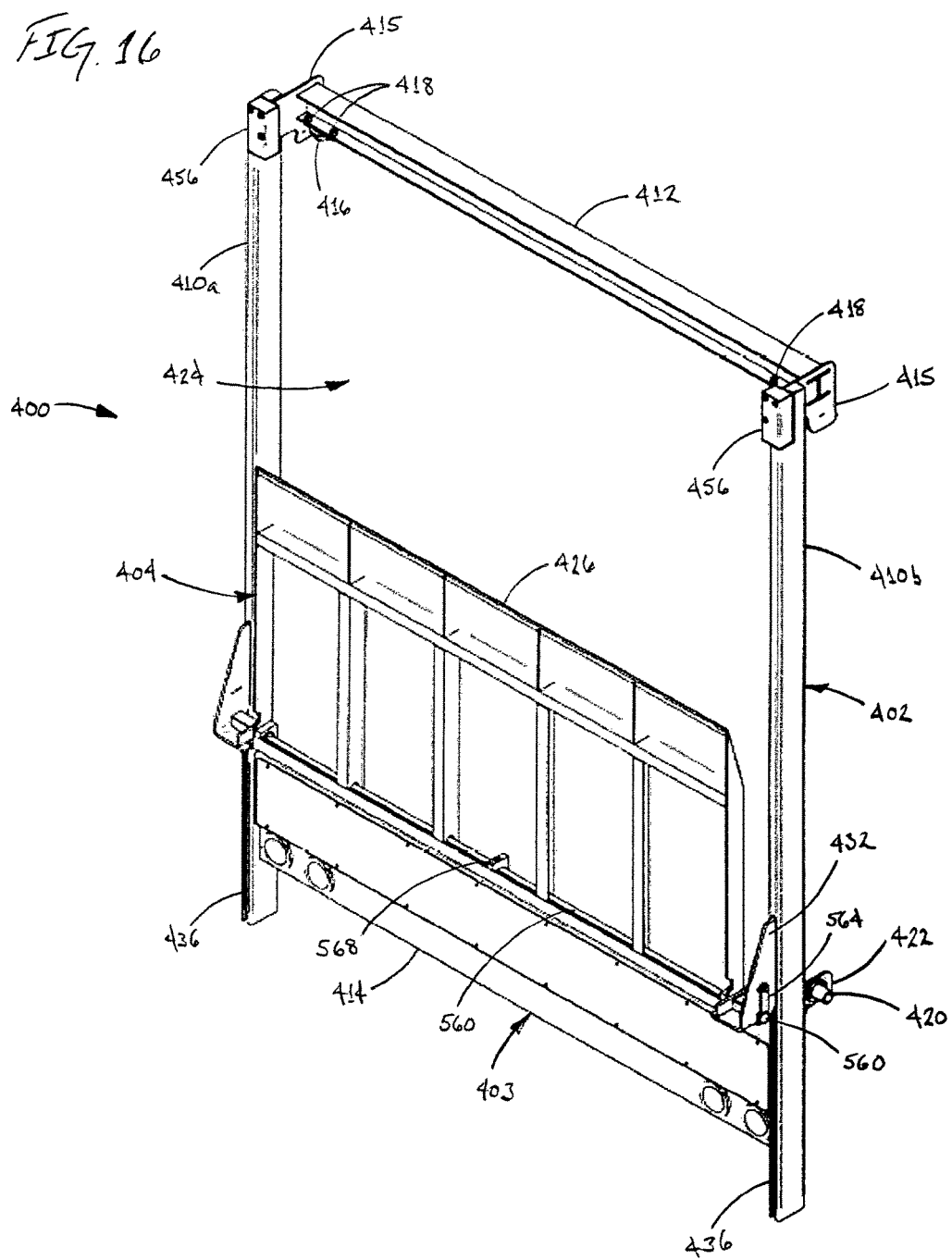

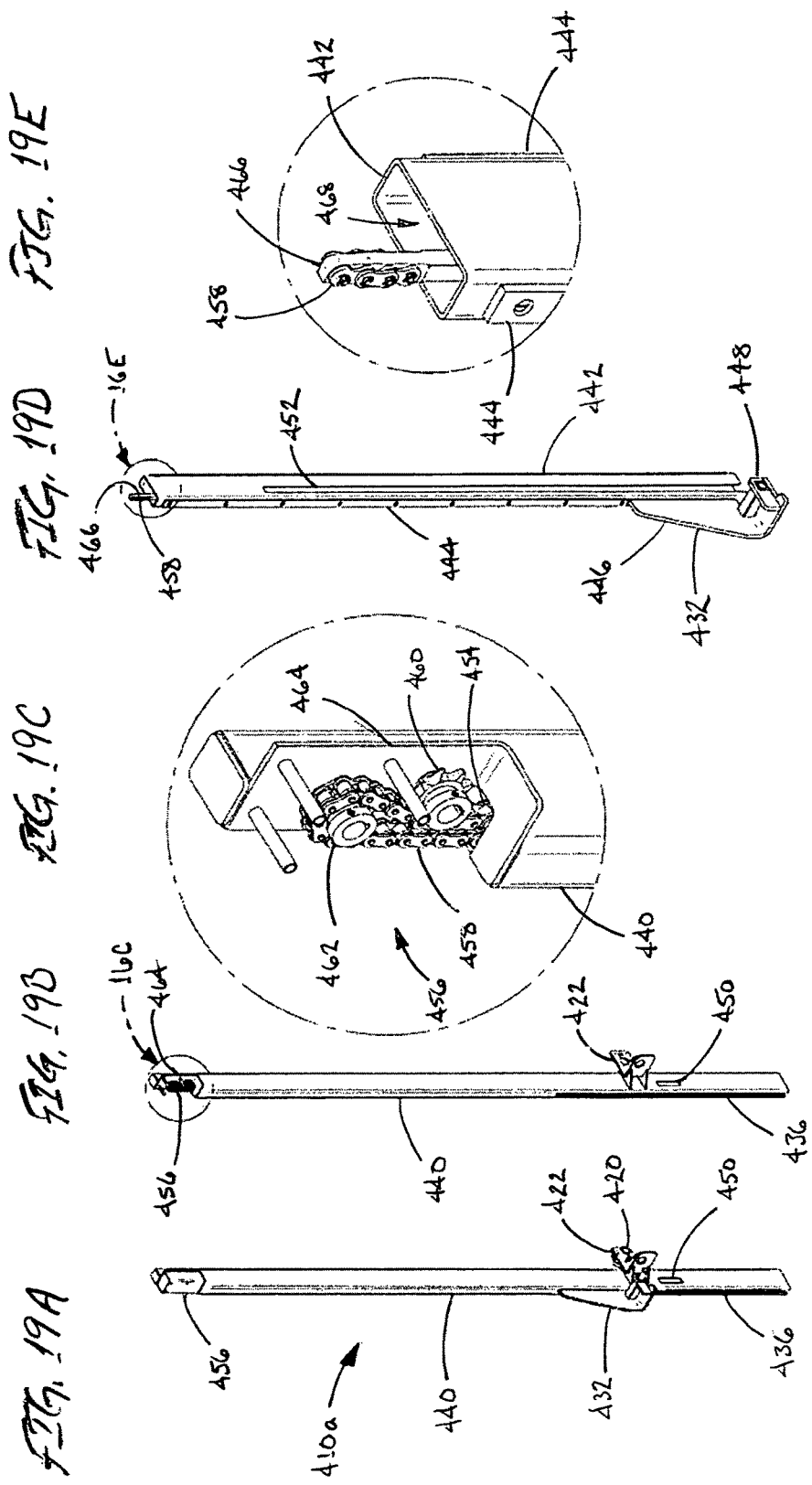

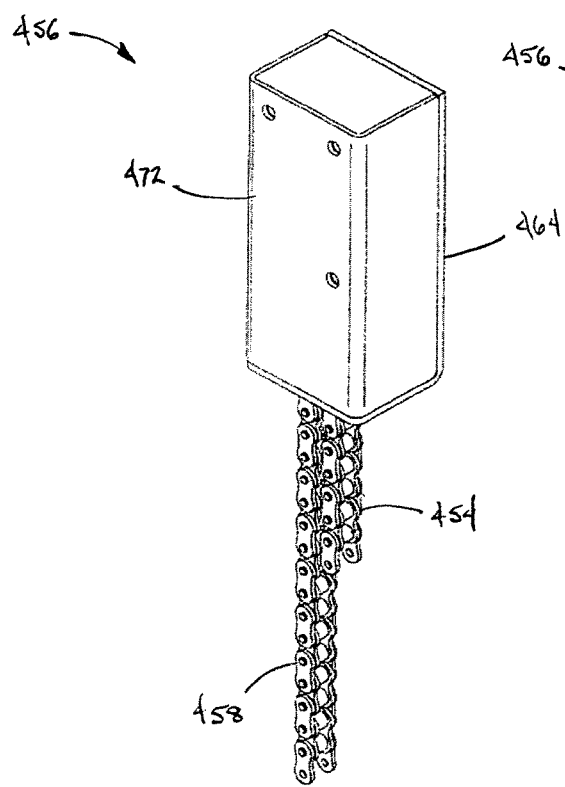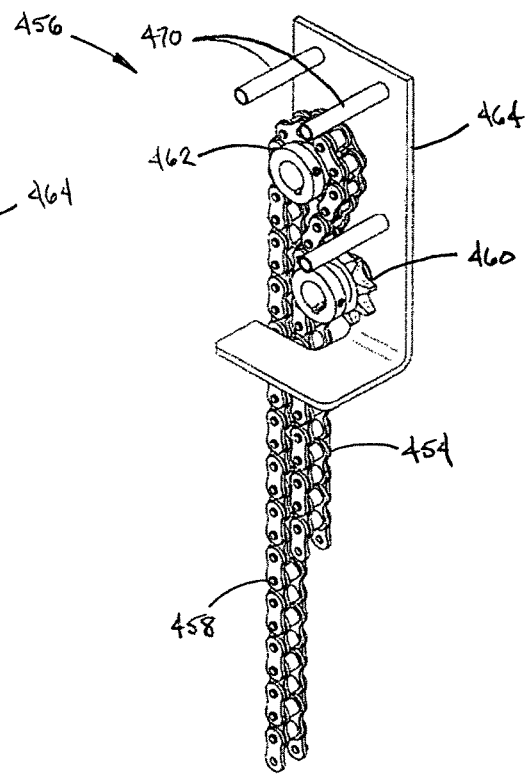

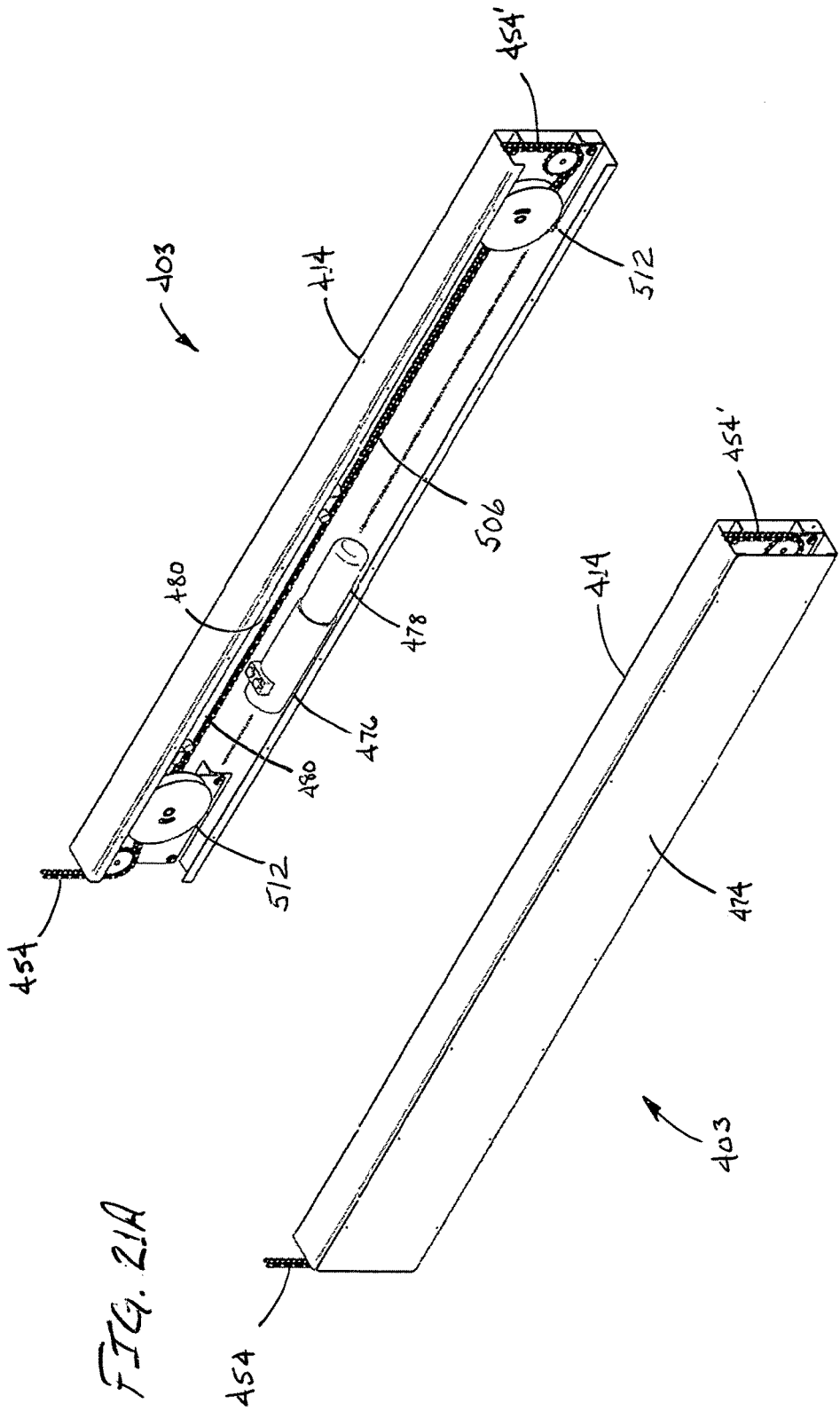

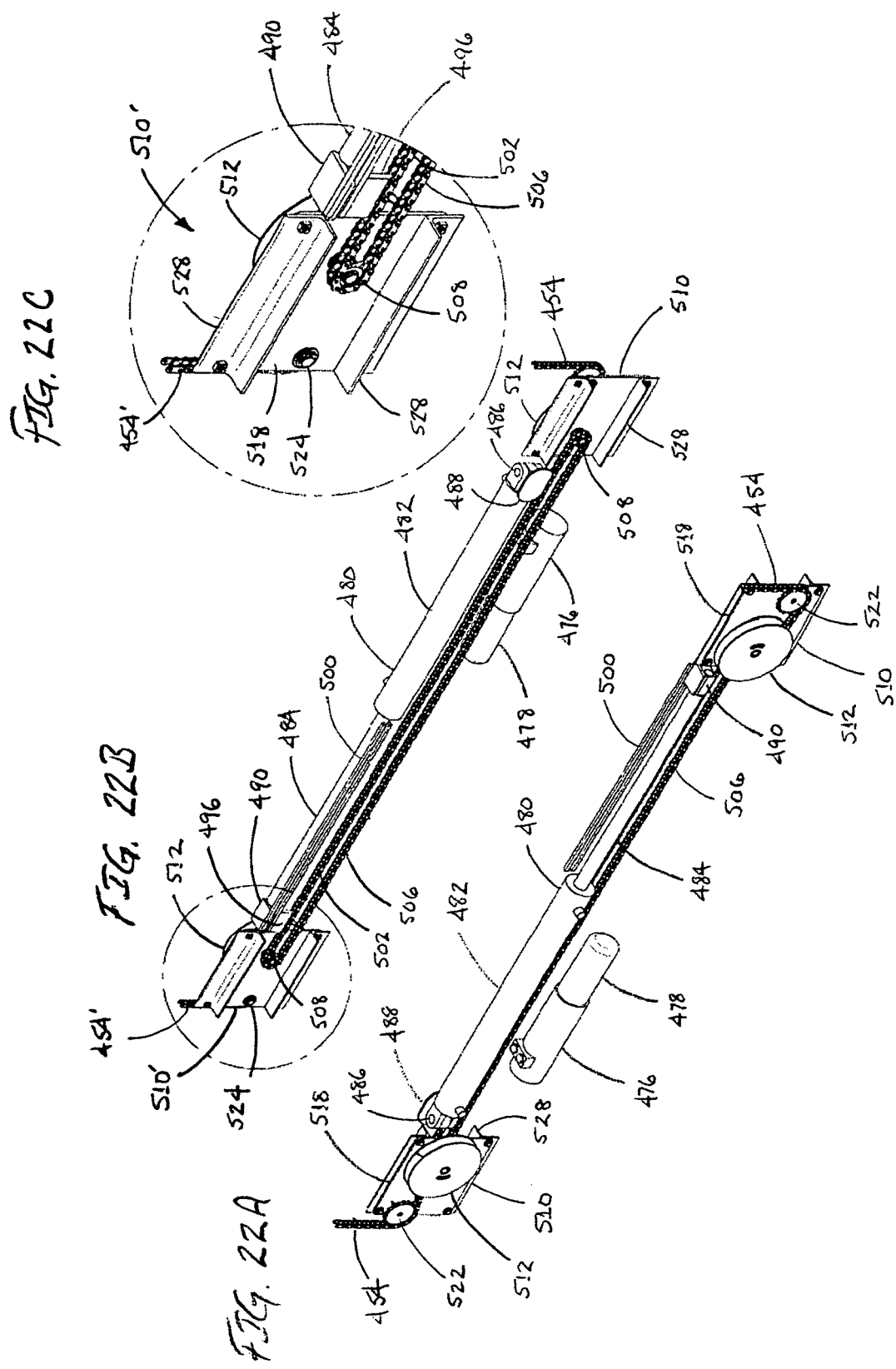

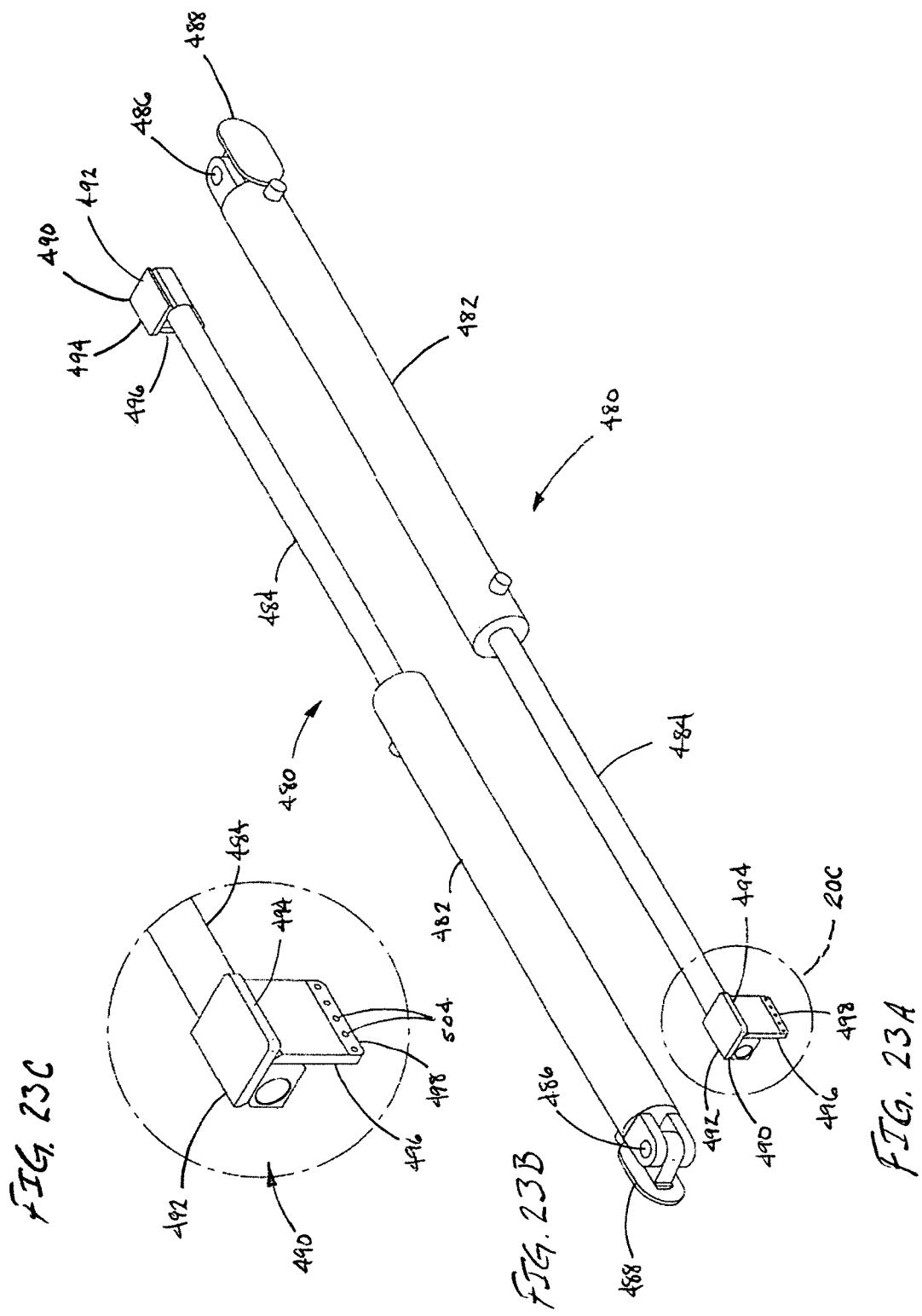

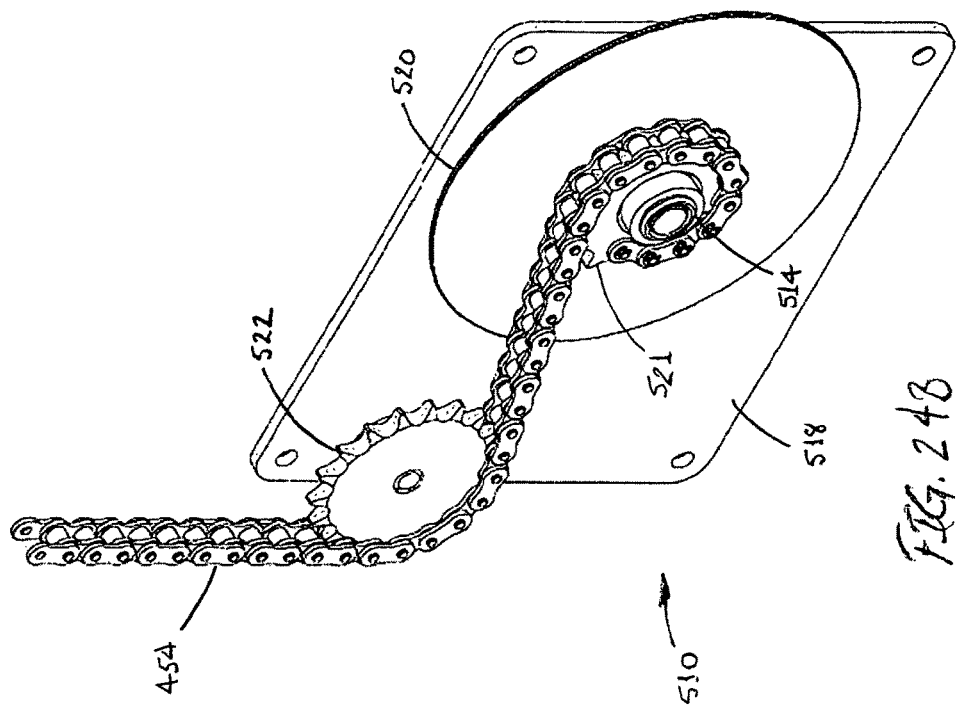
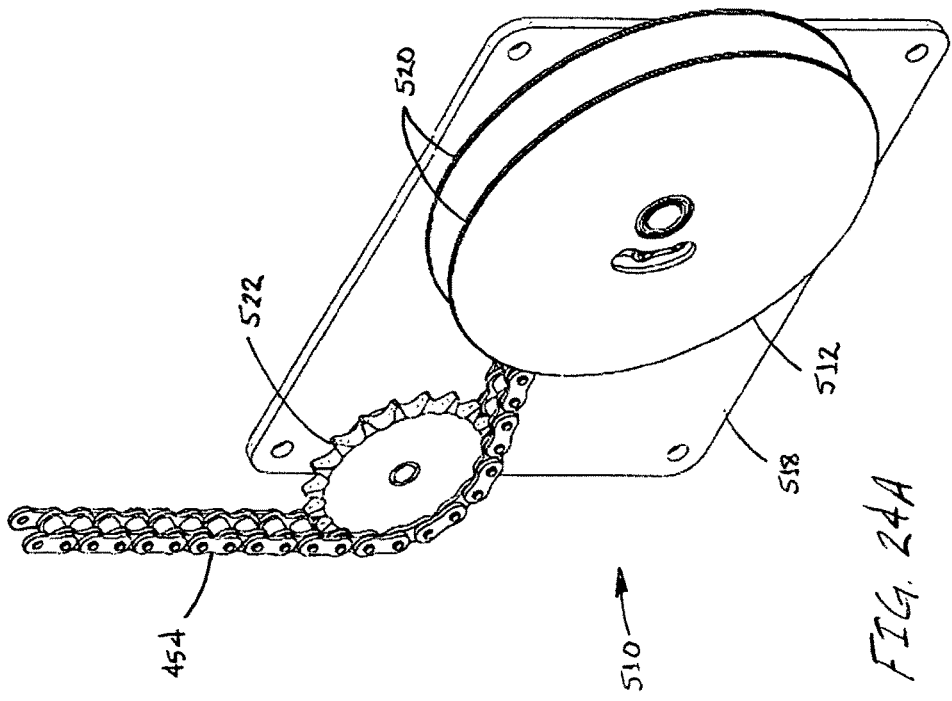

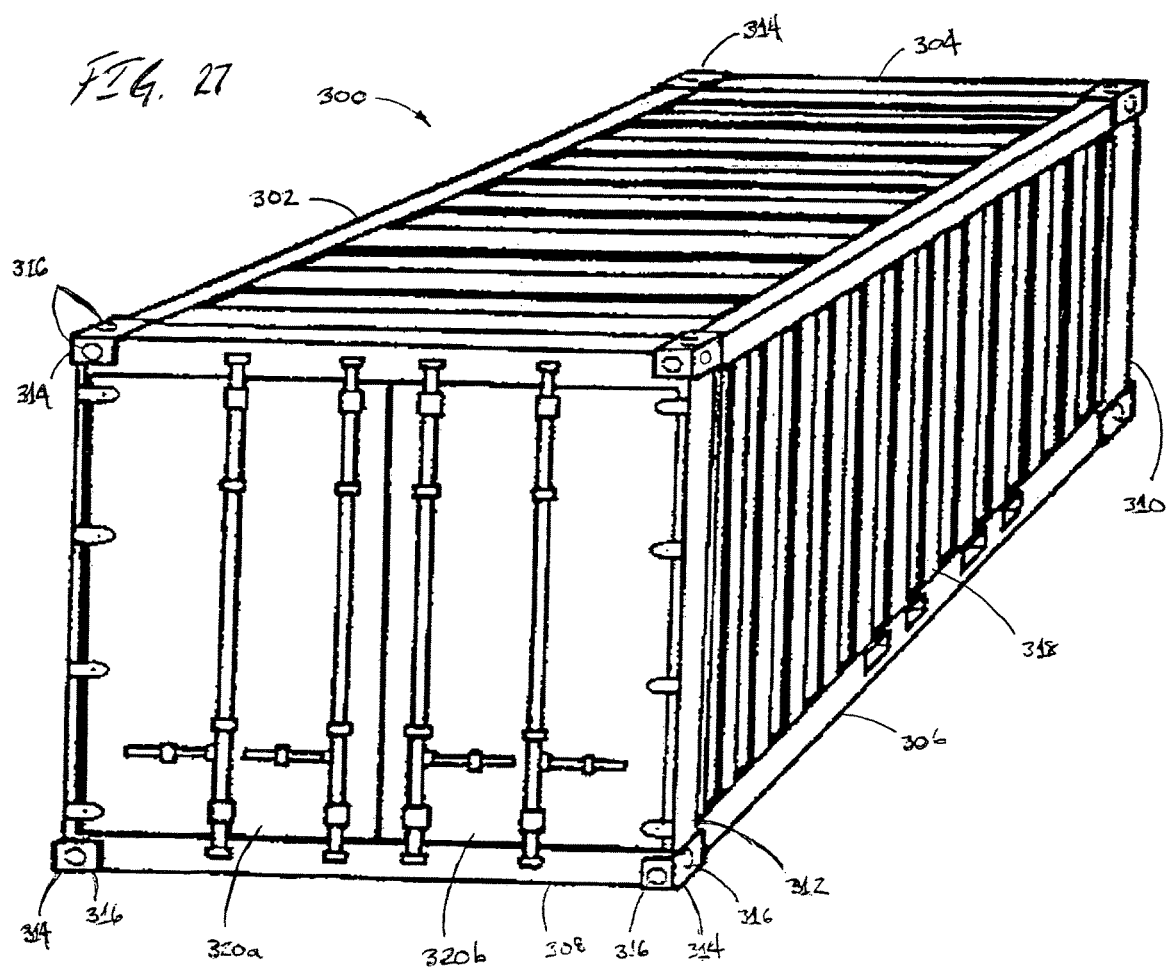

PORTABLE LIFT APPARATUS FOR SHIPPING CONTAINERS

CONTINUING INFORMATION

This application is a continuation-in-part of U.S. Non-Provisional patent application Ser. No. 13/694,045 filed on Oct. 22, 2012 and claims the benefit of U.S. Provisional Patent Application Ser. No. 61/627,911 filed on Oct. 21, 2011.

FIELD OF THE INVENTION

The present invention relates generally to shipping containers, and more particularly to a portable lift apparatus for moving cargo in and out of such containers.

BACKGROUND OF THE INVENTION

Over recent decades most of the marine shipping industry has converted to containerized cargo, wherein products are loaded into large containers (referred to from time-to-time herein as sea containers or shipping containers) of a size approaching that of a conventional truck cargo van, with the containers in turn being loaded onto ships. This allows for economical loading of the individual containers at locations and at rates dictated by convenience, uninfluenced by the significant cost of lay time for a seagoing vessel. Likewise, when the containers are unloaded from the vessel they may be transported by truck or train (i.e., intermodally) to their destinations where the unloading of the individual containers will take place.

The containers are built to standardized patterns, typically having a rectangular framework that supports top, bottom, side and front walls, with doors being pivotally mounted on vertical posts at the rear corners of the container. For example, 13.6 m swapbody containers currently exist, built to ISO (International Organization for Standardization) specifications. These containers normally have corrugated steel sides strengthened by vertical posts at locations 12.2 m (40 feet) apart along the sides. At the top and bottom of each post is a lift point formed by a standard ISO fitting (commonly referred to as a corner casting) that allows the container to be top-lifted by a conventional spreader using twistlock connectors. Also, the construction allows standard laden containers to be stacked atop one another.

The adoption of standardized shipping containers has provided significant benefits with respect to the transportation of non-bulk cargo, nevertheless certain inefficiencies remain, notably in connection with the loading and unloading of the contents of the containers at the end points of their journeys. For example, multiple containers may become backed up at warehouses or other destinations due to limited facilities, each container waiting for its turn at a loading dock or bay. Moreover, some destinations lack loading docks or bays at all, such that the cargo must be painstakingly unloaded—often by hand—from the deck of the container to the ground and vice versa, resulting in significant costs and delays. Some destination therefore become bottlenecks in terms of cargo movement and dead time for the containers themselves, especially smaller warehouses or other locations having limited or loading/unloading facilities. Road-going motor-truck vans may include lift gates mounted at the rear to aid in loading and unloading, however ISO shipping containers lack the truck chassis to which lift gates are mounted, and furthermore including lift gates would be prohibitively expensive and would also interfere with the containers being stacked on ships or rail cars.

SUMMARY OF THE INVENTION

The present invention addresses the problems cited above, and provides a portable lift apparatus which mounts on standardized lift points of a shipping container. The lift apparatus may attach to the four lift points on the back of an ISO sea container, which are typically rated at 20,000 pounds apiece. The apparatus may be placed on and removed from the container using a forklift or may contain features for self-installation. The portable lift apparatus permits the containers to be used efficiently by, for example, small warehouses and business delivery lacking extensive loading docks/bays.

In a broad aspect, the lift apparatus of the present invention comprises (a) a frame that is detachably mountable to an access end of a shipping container so that the lift apparatus is supported by the shipping container, (b) a load platform that supports cargo being loaded or unloaded from the shipping container, and (c) a lift mechanism that raises and lowers the load platform with cargo supported thereon. The frame may include a through opening sized to allow for door clearance at the end of the shipping container so that an interior of the container is accessible therethrough.

The frame may comprise a connector that engages at least one corner casting on the shipping container in load-bearing engagement so as to support the lift apparatus thereon. The connector may comprise at least one pin member that extends inwardly from the frame to engage an opening in the corner casting. The at least one pin member may comprise first and second generally vertically aligned pin members that engage upwardly facing openings of corner castings at upper corners of the access end of the container, and may further comprise first and second generally horizontally aligned pin members that engage outwardly facing openings of corner castings at lower corners of the access end of the container. At least the first and second horizontally aligned pin members may be selectively extensible and retractable so as to detachably engage the openings of the lower corner castings.

In a first embodiment the lift mechanism that raises and lowers the load platform may comprise first and second pivotable lifting arms having the load platform mounted on outer ends thereof. The lift mechanism may further comprise a linkage that maintains the load platform in a horizontal orientation as the platform is raised and lowered on lift arms. The linkage that maintains the load platform in a horizontal orientation may comprise horizontal axis pivot connections between the platform and the ends of the lift arms, and a tension linkage that rotates the load platform on the horizontal axis pivot connections as the lift arms raise and lower the platform. The tension linkage that rotates the load platform on the horizontal axis pivot connections may comprise a chain-and-sprocket assembly operatively connected to the platform. The lift mechanism may further comprise at least one motor mounted on the frame of the lift apparatus. A pulley assembly may interconnect the at least one motor and the lift arms having the load platform mounted thereon. The at least one motor may comprise a plurality of motors mounted in substantially coaxial alignment across a lower portion of the frame. The assembly may further comprise at least one battery that supplies electrical power to the at least one motor.

In another embodiment, the drive mechanism that raises and lowers the load platform may comprise (a) first and second chain reels mounted to end portions of the horizontal lower member of the frame proximate the vertical side members of the frame, (b) first and second actuating chains routed generally vertically on the vertical side members of the frame, each actuating chain having a first lower end connected to one of the chain reels, a middle portion routed over at least one idler mounted to an upper portion of one of the vertical side members, and a second lower end connected to the lift platform, (c) a drive chain routed generally horizontally on the horizontal lower member of the frame, that interconnects the first and second chain reels so that in response to operation of the drive chain in a first direction the chain reels retract the actuating chains to raise the lift platform and in response to operation of the drive chain in a second direction the chain reels pay out the actuating chains to lower the lift platform, and (d) an actuator that drives the drive chain in the first and second directions to raise and lower the lift platform. The actuator that drives the drive chain in the first and second directions may comprise a selectively extensible and retractable hydraulic cylinder mounted generally horizontally on the horizontal lower member of the frame, the hydraulic cylinder having a first end mounted to the horizontal lower member and a second end mounted to a generally horizontal run of the drive chain.

The invention further provides a method for loading or unloading shipping containers, comprising the steps of (a) detachably mounting a portable frame of a lift apparatus to an access end of a shipping container so that the lift apparatus is supported by the shipping container, (b) supporting cargo being loaded or unloaded from the shipping container on a load platform of the apparatus, and (c) raising and lowering the load platform of the apparatus with the cargo supported thereon.

The step of detachably mounting the frame of the lift apparatus to an access end of a shipping container may comprise engaging a lift point on the access end of the container with a pin member mounted on the frame of the lift apparatus so that the lift apparatus is supported on the end of the container. The lift point may be a standard corner casting of the shipping container. The step of engaging a lift point on the access end of the container with a pin member mounted on the frame of the lift apparatus may comprise engaging upwardly facing openings of first and second corner castings on the access end of the container with first and second downwardly extending pin members on the frame. The step of engaging upwardly facing openings of first and second corner castings on the access end of the container by first and second downwardly extending pin members on the frame of the lift apparatus may comprise lowering the frame of the lift apparatus onto the container so that the downwardly extending pin members engage the upwardly facing openings of the first and second corner castings on the access end of the container.

The method may further comprise the sequential steps of (d) raising the frame of the lift apparatus off of the shipping container so that the downwardly extending pin members disengage from the upwardly facing openings of the first and second corner castings on the access end of the container; (e) transporting the lift apparatus to a second shipping container; (f) lowering the frame of the lift apparatus onto the second shipping container so that the downwardly extending pin members engage the upwardly facing openings of the first and second corner castings on the access end of the second shipping container so that the lift apparatus is supported by the second container; (g) supporting cargo being loaded or unloaded from the second shipping container on the load platform of the apparatus; and (h) raising and lowering the load platform of the apparatus with the cargo loaded into or unloaded from the second container supported thereon.

These and other features and advantages of the present invention will be more fully appreciated from a reading of the following detailed description with reference to the accompanying drawings.

BRIEF DESCRIPTION OF THE DRAWINGS

FIG. 13 is a second perspective view of the portable lift assembly of FIGS. 1-6 and 12, with a broken-line image indicating the shipping container having the lift assembly temporarily mounted at an end thereof, and showing the load platform of the assembly in its raised, horizontal configuration for movement of cargo into or out of the container;

FIG. 14 is a second perspective view of the portable lift assembly FIGS. 1-6 and 12 mounted on the end of the container, similar to FIG. 13, but showing the load platform of the assembly in its lowered, horizontal configuration for movement of cargo to and from the ground or other area adjacent the container;

FIG. 15 is a perspective view of a portable container lift assembly in accordance with another embodiment of the present invention, having a chain-and-sprocket lift mechanism, showing the assembly with the platform in the raised position;

FIG. 16 is a second perspective view of the portable lift assembly of FIG. 15, showing the assembly with the platform in the folded and stowed position;

FIGS. 19A-19E are perspective view so the components of the left-side vertical rail of the lift assembly of FIG. 15, showing respectively the assembly rail, the outer tube of the rail, the sprocket assembly at the mast head of the outer tube of the rail, the inner tube of the rail that is slidingly received in the outer tube, and the chain attachment to the inner tube by which the latter is raised and lowered within the outer tube of the rail;

FIGS. 20A-20B are enlarged perspective views of the sprocket mechanism at the upper end of the left-hand side of the vertical rail of FIG. 19A, showing the mechanism with, respectively, the cover installed and the cover removed to expose the internal components to view;

FIGS. 21A-21B are perspective view of the drive mechanism of the lift assembly of FIG. 15, housed in a lower cross-member of the frame of the assembly, showing the drive mechanism with, respectively, the cover installed and with the cover removed to expose the internal components to view;

FIGS. 22A-22C are perspective views of the drive mechanism of the lift assembly of FIG. 15, separated from the horizontal cross-member of FIGS. 21A-B for clarity, being respectively (a) a front perspective view of the mechanism, (b) a rear perspective view of the mechanism, and (c) a partial rear perspective view of the reel assembly at one end of the mechanism that transfers drive to the vertical chains that raise and lower the inner tubes of the vertical side rails;

FIGS. 23A-23C are perspective views of the hydraulic actuator of the drive mechanism of FIGS. 19A-19C, being respectively (a) a rear perspective view of the actuator, (b) a front perspective view of the actuator, and (c) an enlarged, partial perspective view of the bracket that connects the rod of the hydraulic actuator to the chain of the drive mechanism;

FIGS. 24A-24B are front perspective views of the left-hand side reel assembly of the drive mechanism of FIGS. 22A-22B, that transfers drive from the horizontal chain of the drive mechanism showing the assembly with, respectively, the outer plate of the chain reel in place and the plate removed for purposes of clarity;

FIG. 27 is a perspective view of an exemplary ISO standard shipping container, showing the corner castings that form the load bearing engagement points and also the cargo doors at the end that provide access to the interior of the container.

DETAILED DESCRIPTION

Figure 1:
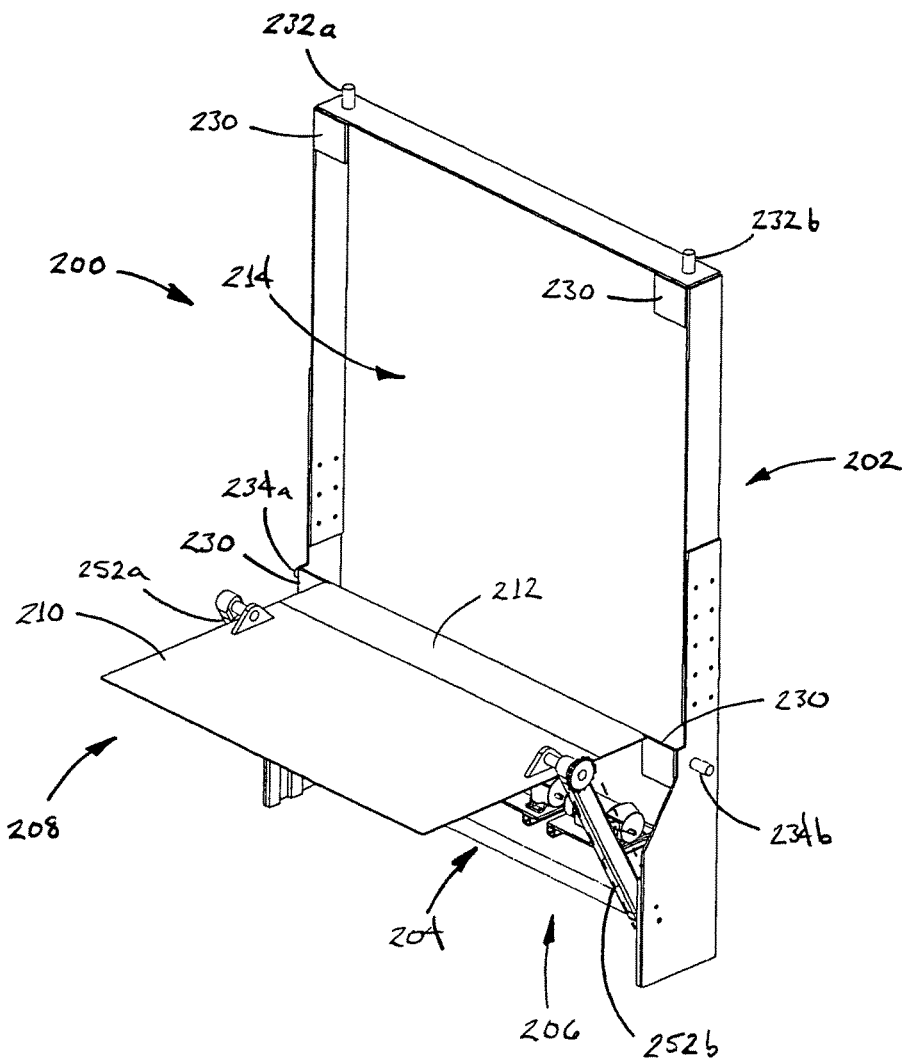
FIG. 1 is a perspective view of a portable lift assembly in accordance with the present invention, showing the assembly with the load platform thereof in a raised and horizontal orientation.
Figure 2:
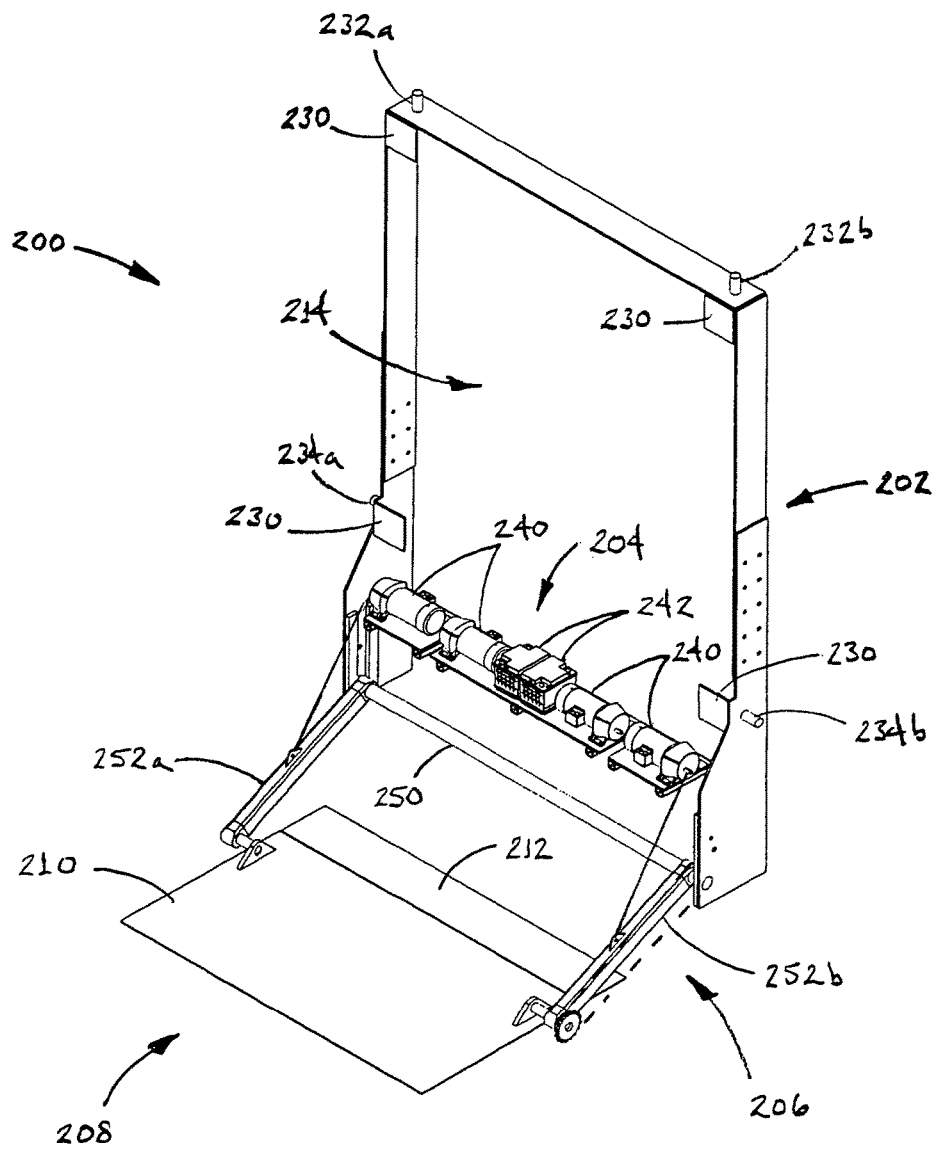
FIG. 2 is a second perspective view of the portable lift assembly of FIG. 1, showing the assembly with the platform in a lowered and horizontal orientation.
Figure 3:
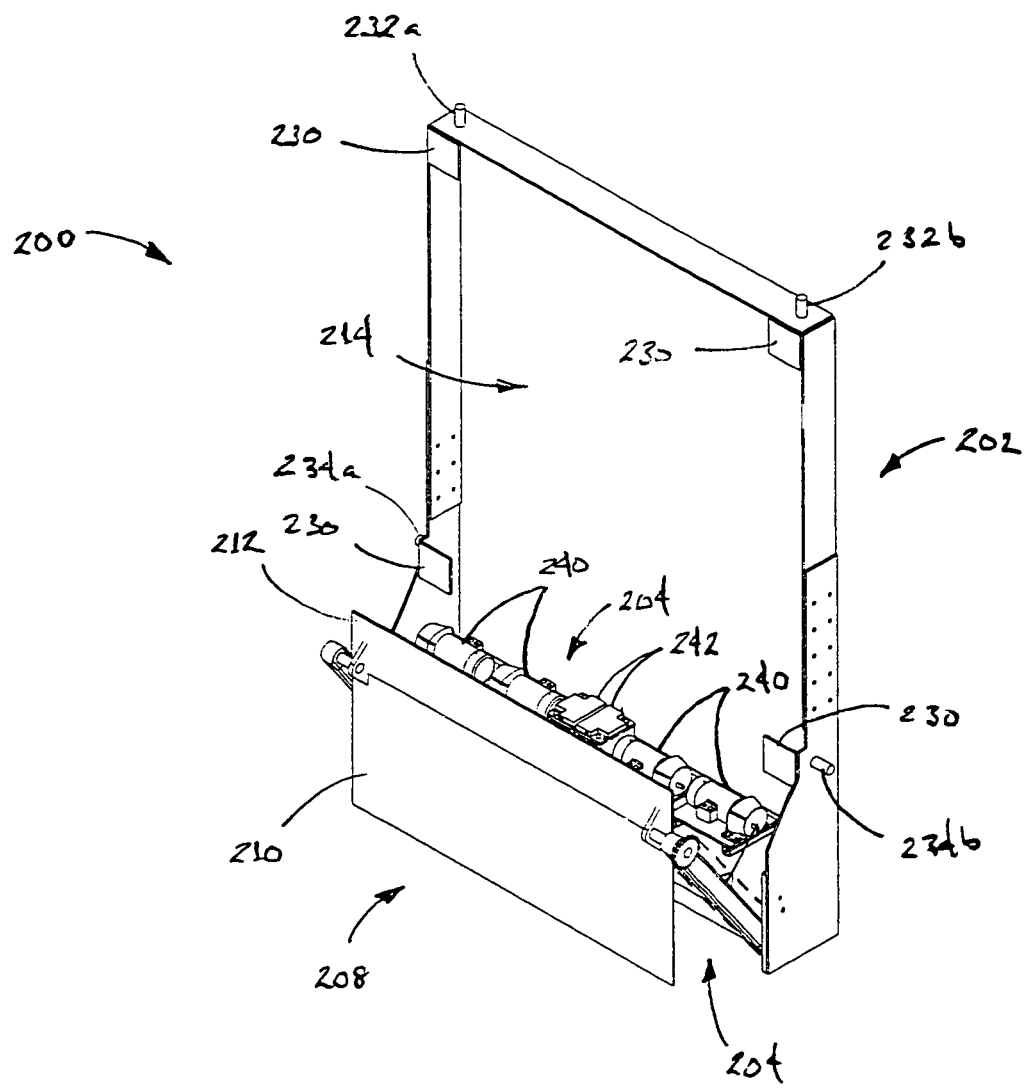
FIG. 3 is a perspective view of the portable lift assembly of FIG. 1, showing the assembly with the platform stowed in a raised and vertically folded orientation.
Figure 4:
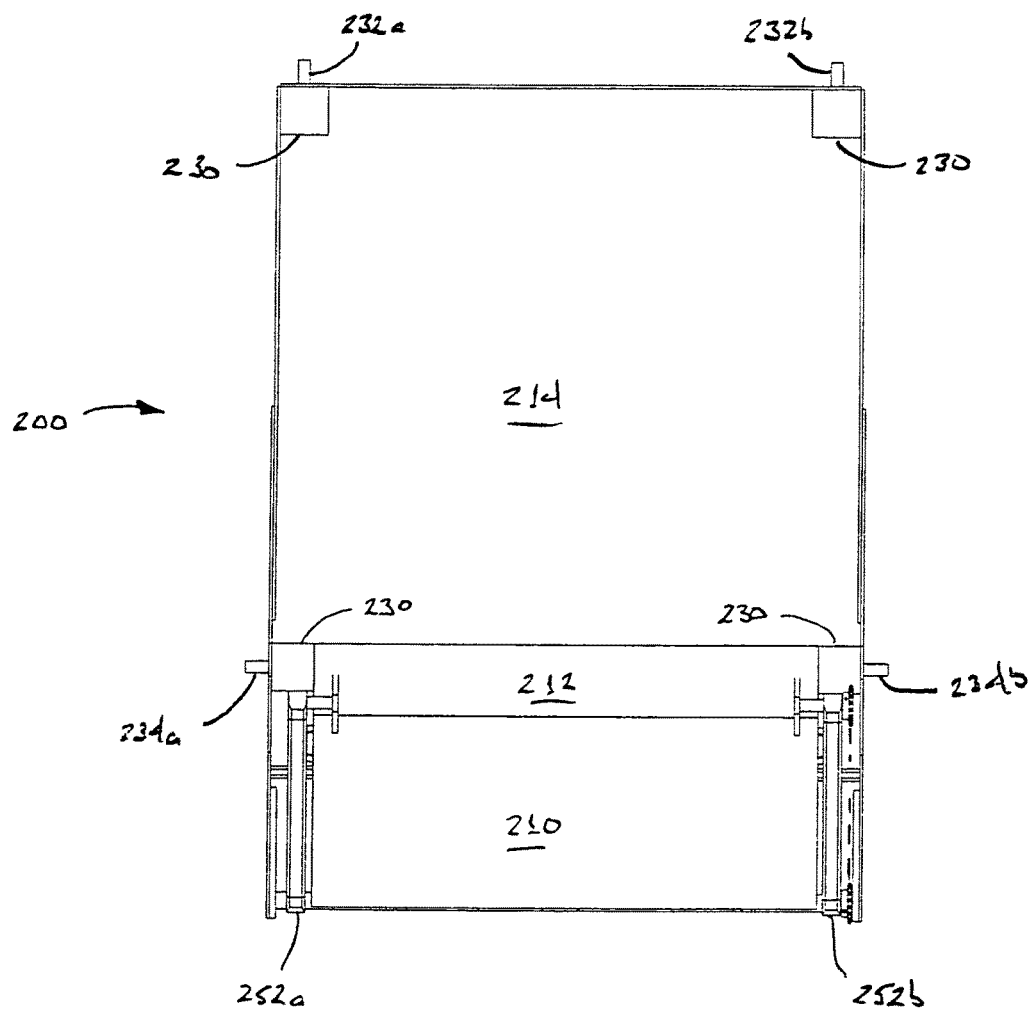
FIG. 4 is a rear elevational view of the portable lift assembly of FIG. 3.
Figure 5:
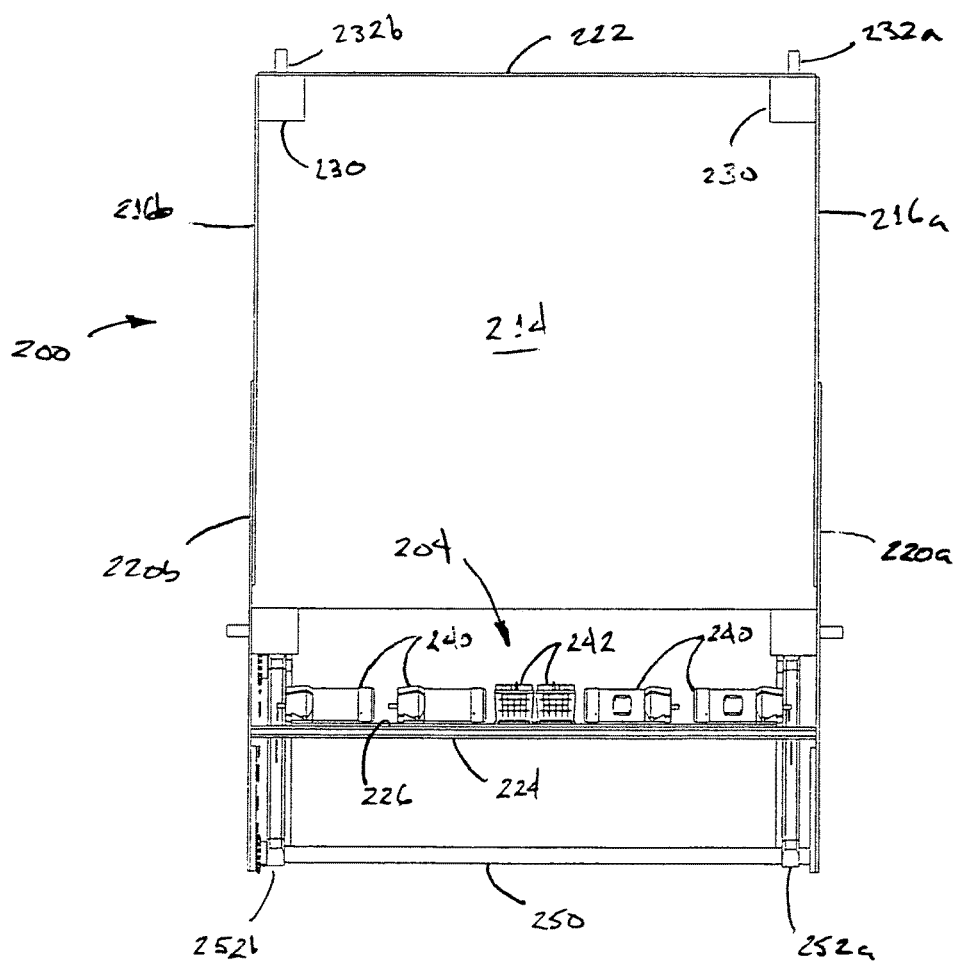
FIG. 5 is a front elevational view of the portable lift assembly of FIGS. 3-4.
Figure 6:
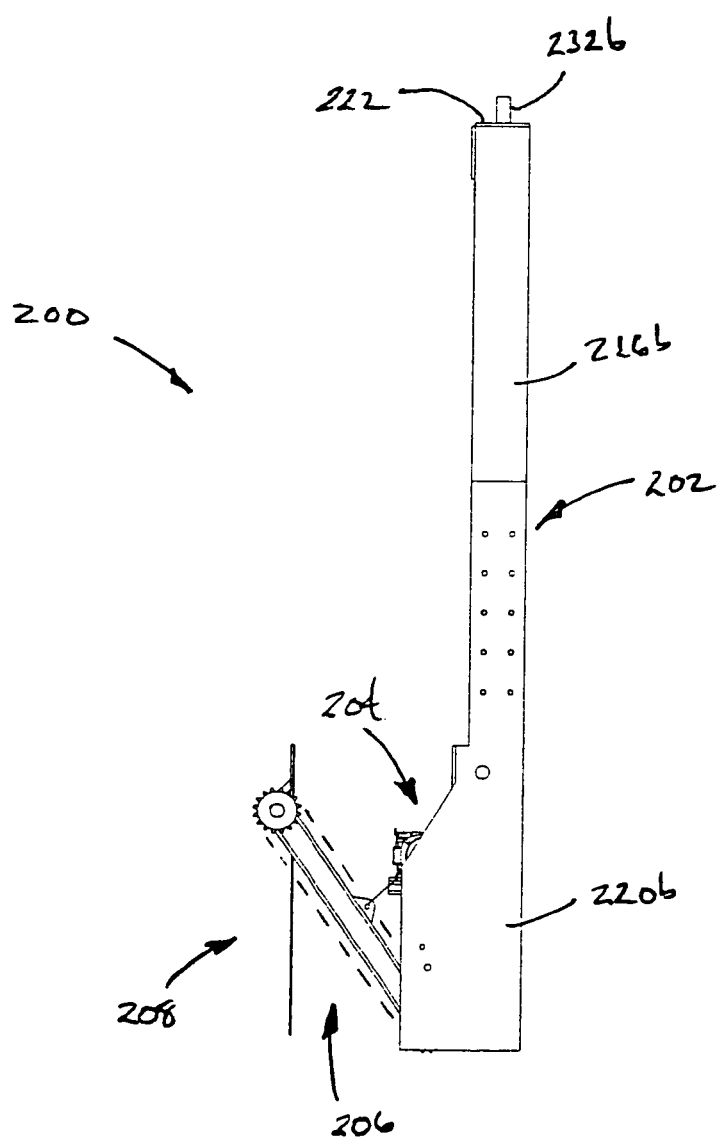
FIG. 6 is a side elevational view of the portable lift assembly of FIGS. 3-5.

FIGS. 1-6 show a portable lift assembly 200 in accordance with the invention. As will be described in greater detail below, principal subassemblies of the portable lift assembly include a frame section 202, a drive section 204, a lifting arm section 206 and a platform section 208. The frame section mounts to the end of a shipping container using pins that mate with the standard corner castings. The platform section 208 lowers/raises cargo employing a set of electric motors that are mounted to a cross member of the frame section and driven by a battery pack. The lift platform is aligned and locked in a vertical orientation when in the stowed configuration, and then rotated to the horizontal orientation to receive loads and lift/lower them between the container deck and the ground or other surface. The assembly maintains the platform level during movement between raised and lowered positions, by means of a chain-and-sprocket linkage.

FIG. 15 shows an exemplary standard ISO-standard shipping container 300. The container includes a rectangular frame constructed of upper and lower sets of horizontal lengthwise and crosswise members 302, 304, 307, 308, connected by sets of vertical post members 310, 312 at each end. At each corner of the container, the horizontal/vertical frame members meet at an ISO corner casting 314 having openings 316 on upwardly and/or outwardly facing sides. As was discussed above, the corner castings form lift points and have high weight ratings, owing to their intended use with cranes and other handling equipment that load/unload the containers to and from ships, trains and other modes of transportation. The areas between the frame members of the container are spanned by panels 318 that form actual cargo enclosure, one end including a set of vertically hinged access doors 320a, 320b. Corner castings as shown in FIG. 15 represent the most common form of lifting points in current use, however it will be understood that the apparatus of the present invention may be adapted for use with other designs of lifting points that may be available at present or in the future.

Figure 8:
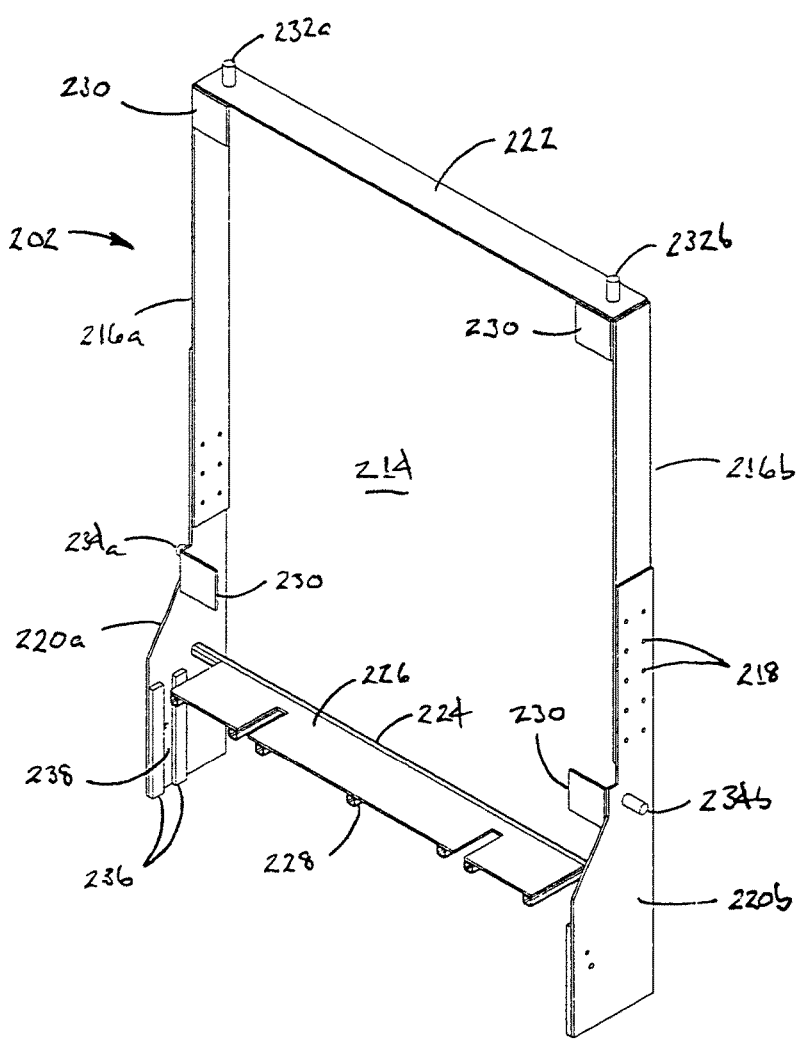
FIG. 8 is a perspective view of the frame of the portable lift assembly of FIGS. 1-6.

As perhaps is most clearly seen in FIG. 8, the frame section 202 of the lift assembly 200 has a somewhat upright configuration, with vertical and horizontal members defining an opening 214 that is sized to fit an end of a standard ISO shipping container as described above, with clearance such that the access doors of the container can be opened and cargo passed therethrough onto and off of the load platform of the assembly. Swivel-type door holders (not shown) may be included to keep the container doors open and out of the way while the load platform is in use. Also, the frame section may optionally be constructed to be adjustable to accommodate containers having different standard widths, e.g., 102 inches and 114 inches.

In the embodiment illustrated in FIGS. 1-6, the frame section of the lift assembly is suitably constructed primarily of steel plate, with the opening being bordered at the sides by vertically elongate side plates 216a, 216b joined by rivets or other fasteners 218 to lower side plates 220a, 220b. A horizontal header plate 222 is mounted across the upper ends of the side plates, while a horizontal crossbar 224 spans the lower side plates 220a, 220b. A horizontal shelf plate 226 extends rearwardly (i.e., in a direction generally away from the receiving area for the container) atop brackets 228 formed by bar studs mounted to crossbar 224, and provides a support for the drive section 204 (see FIGS. 7-8) of the lift assembly.

Transverse, generally vertical stop plates 230 are mounted in the corners between the side plates 216 and header plate 222 of the frame, and also to the lower side plates 220a, 220b above the crossbar and drive shelf 226, in locations where the stop plates will contact the corner castings of the containers so as to halt movement when the lift assembly is in the correct position to be joined to the container. Locking pins are located proximate the stop plates so as to be aligned with the openings in the corner castings when the lift assembly is positioned by the stop plates coming up against the corner castings, the upper set of pins 232a, 232b passing vertically through cooperating bores in header plate 222 to be received in the upper openings of the top corner castings and the lower set of pins 234a, 234b extending horizontally through lower side plates 220a, 200b to be received in the lateral, outward openings of the bottom corner castings. The locking pins may utilize turn-locks or other suitable mechanisms that allow them to be extended and retracted, and in some embodiments the upper pins may simply be fixed in the frame so as to be held in place by gravity when set in the corner castings.

The frame section also includes parallel sets of guide plates 236 mounted on the inward sides of the lower plate members that form generally vertically extending guide channels 238, the function of which will be described in greater detail below.

As can be seen with further reference to FIGS. 2-3, 5 and 7, the drive section 204 in the illustrated embodiment includes two pairs of electric drive motors 240, with power being supplied from batteries 242 in a central battery pack. The battery-powered motors allow the lift assembly to operate independent of any external power source, which greatly enhances flexibility; it will be understood, however, that some embodiments may be configured to operate on power from an external source, e.g., via an electric power cord. The motors are mounted on the support shelf 226 of the frame, with the batteries preferably being removably mounted in a tray or trays. The coaxial alignment of the motors on the transverse shelf provides a compact, space efficient package and also simplifies the drive mechanism, but again it will be understood that the numbers and positions of the motors and batteries may vary in some embodiments.

Figure 7:
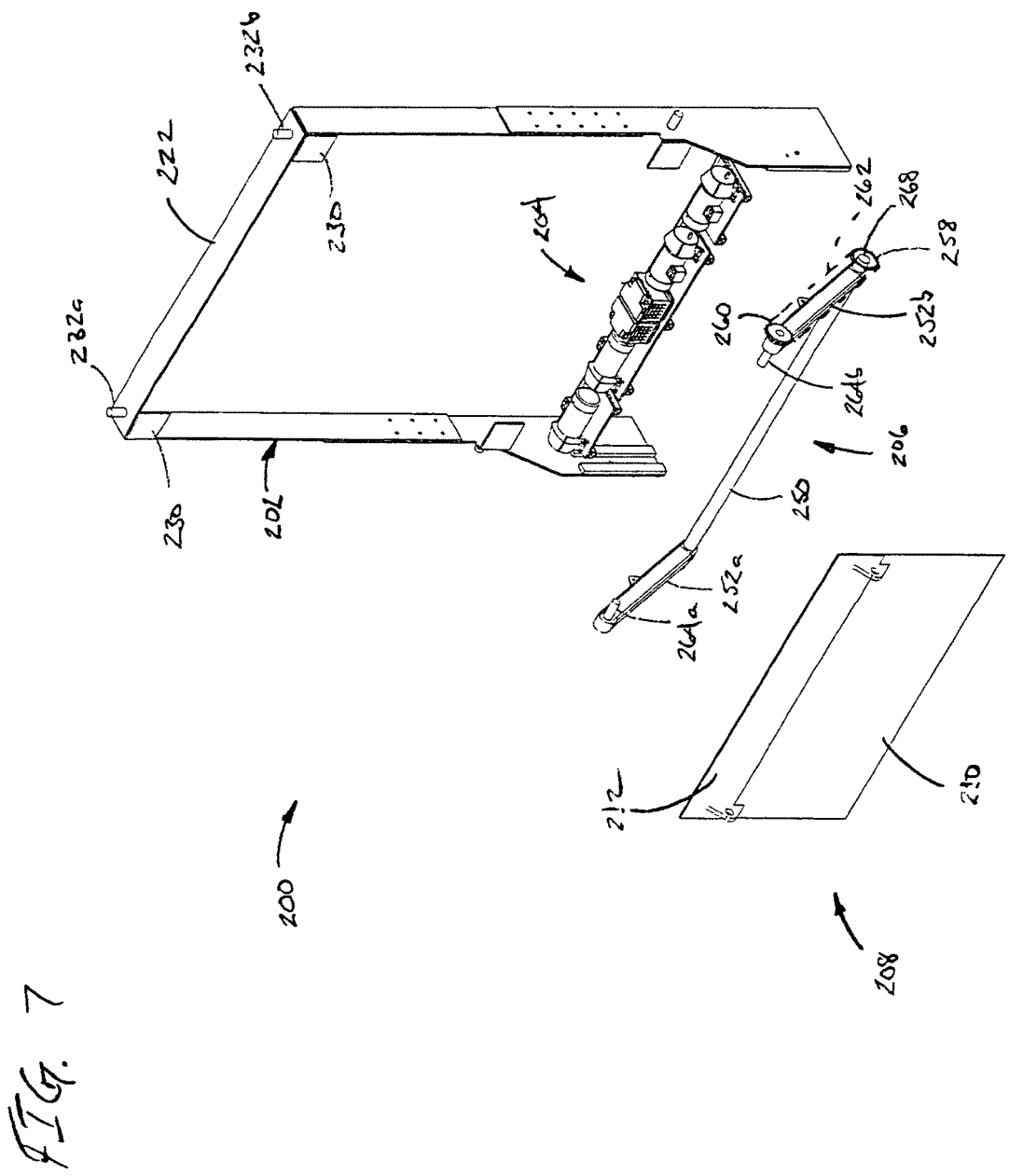
FIG. 7 is a perspective, partially exploded view of the portable lift assembly of FIGS. 3-6, showing the major component groups thereof in greater detail.
Figure 9:
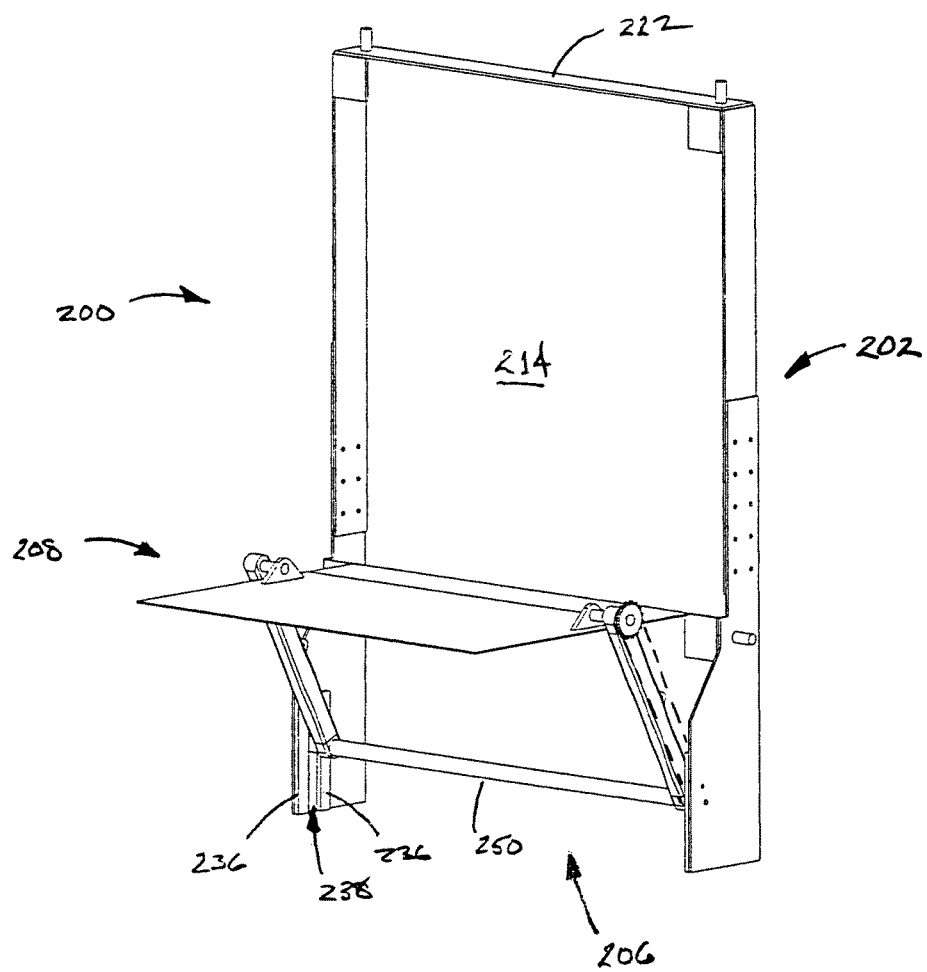
FIG. 9 is a second perspective view of the frame of the portable lift assembly of FIGS. 1-6, with the lift arms and platform being shown mounted thereto.
Figure 10:
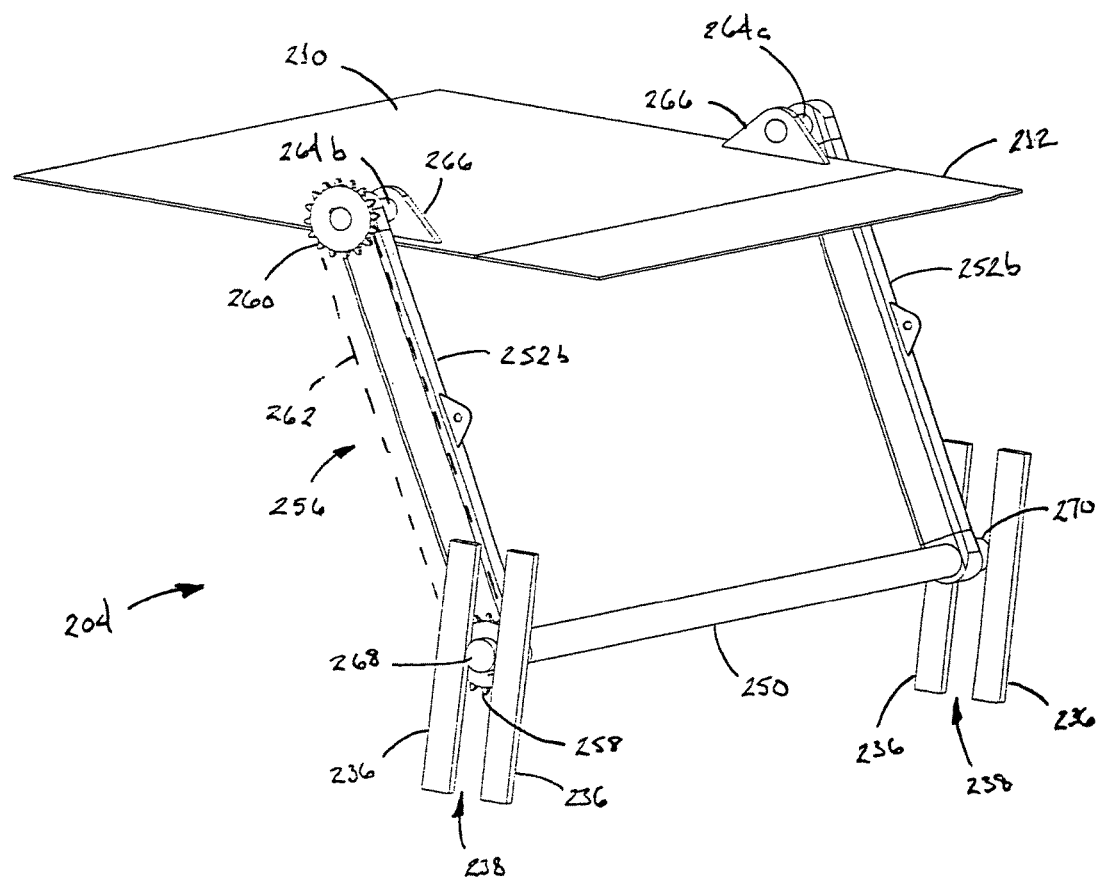
FIG. 10 is a perspective view of the lift arms and platform of FIG. 9, looking from a forward angle, showing the manner in which the axle to which the arms are mounted is supported for vertical sliding movement in track members that are mounted to the side plates of the frame.

Power from the drive section is employed by the lifting arm section 206 to raise and lower the platform section, via pulley assemblies having cables (not shown) that connect the motor pairs to the arms. As can be seen in FIG. 7 and also FIGS. 9-10, the lifting arm section includes a transverse axle 250 that extends horizontally between the parallel lifting arms 252a, 252b. A linkage 254 that shifts the platform section between vertical and horizontal, and maintains the load platform level in the latter orientation while raising/lowering cargo, is mounted on lift arm 252b, and includes lower and upper sprockets 258, 260 connected by a drive chain 262 (the latter being shown as a dotted-line for ease of illustration).

The main lift plate 210 of the platform assembly is supported from the upper ends of the lift arms 252a-b, by axle pins 264 that are rotatingly received in the ends of the lift arms and fixedly mounted to flanges 266 on the lift plate. Sprocket 260 is keyed on an end of axle pin 264b outboard the end of the lift arm, so that rotation of the sprocket by the drive chain causes the platform to pivot within upper ends of the arms 252a, 252b. At the opposite, lower end of arm 252b, sprocket 258 is rotatingly mounted on transverse axle bar 250, with an end 268 of the axle bar protruding beyond the sprocket and being received in the vertical channel 238 between the guide plates 236 that are mounted on the lower side plates of the frame section A second end 270 of the axle bar is likewise received in the channel formed between guides on the other side plate 220b of the frame. The ends 268, 270 of the axle bar are thus captured for vertical movement within the guide channels, as the arms and platform are raised/lowered by the drive section, with the cylindrical surfaces of the ends also permitting the axle bar to rotate within the channels.

Figure 12:
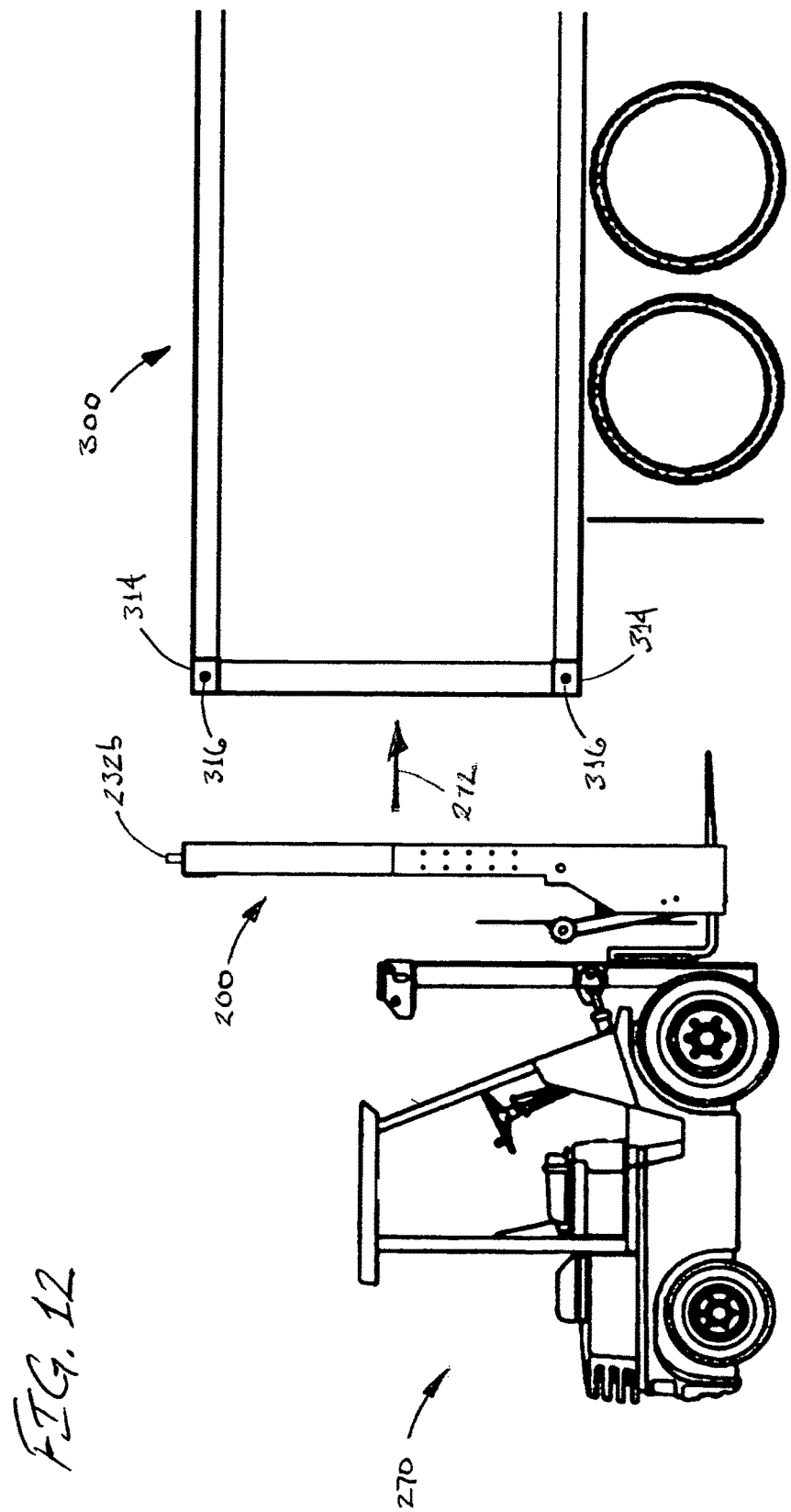
FIG. 12 is an environmental, side elevational view of the portable lift assembly of FIGS. 1-6, showing the lift assembly carried on an exemplary forklift and illustrating the manner in which the assembly is raised and transported thereon for temporary mounting to the end of a shipping container.

To attach the lift assembly, a forklift or similar machine raises the assembly as shown in FIG. 12 and moves it to the access end of the container in the direction indicated by arrow 272. The operator then tilts the assembly forward and drops it atop the end of the container. As this is done, the stop plates arrest forward movement of the assembly, and the upper pins 232a-b drop into the top holes of the corner castings while the bottom of the frame lines up as the forklift backs away and leaves the lift hanging. Lower lock pins 234a-b are then extended to engage the lower corner castings so as to prevent motion between the lift assembly and the containers. Owing to the strength of the corner castings and frame members, the end of the container is well able to support the weight of the lift assembly together with the cargo carried thereon, e.g., 5,000+ pounds.

Figure 11:
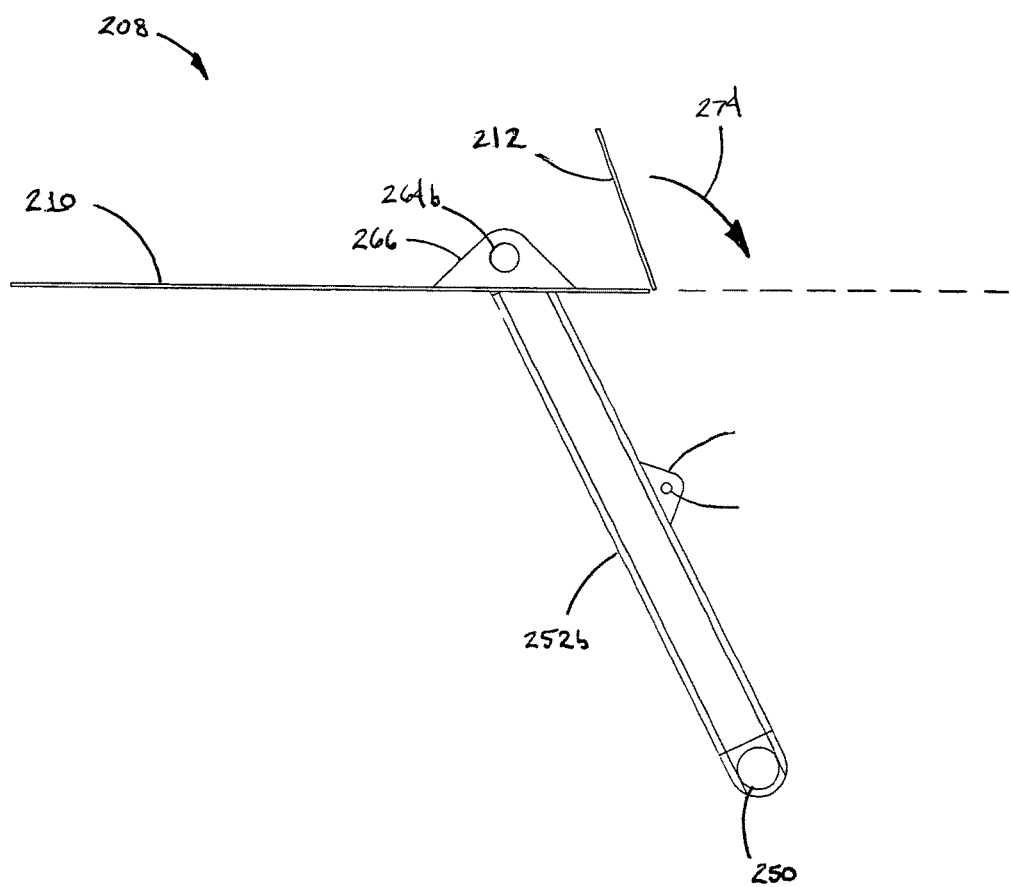
FIG. 11 is a side elevational view of the load platform and lift arms of FIG. 10, showing the manner in which the kick panel of the platform folds down to bridge the gap between the main lift plate of the platform and the deck of a shipping container.

The platform section is rotated to the horizontal orientation and raised level with the interior floor of the container, and the doors 320a-b of the container are opened outwardly via the opening 214 of the frame. The hinged kick plate 212 is pivoted as indicated by arrow 274 in FIG. 11 and dropped into place to cover the gap between the cargo floor and the main load plate 210. Personnel can then safely and conveniently access the interior of the container (e.g., using wheeled pallet jacks or hand trucks), with the cargo being carried by load plate 210 between the raised position shown in FIG. 13 and the lowered position shown in FIG. 14, as indicated by arrow 276.

FIG. 15 shows a portable lift assembly 400 in accordance with another embodiment of the invention. Principal subassemblies of lift assembly 400 include a frame section 402, a drive section 403 housed in a lower cross-member of the frame section, and a platform section 404. In contrast with the embodiment described above, the platform of lift assembly 400 is raised and lowered by a chain-driven mechanism acting on vertically sliding members housed within the upright side rails of the frame section.

Frame section 402 has an upright, generally rectangular configuration and includes left and right vertical side rails 410a-b that are joined at their upper ends by an upper horizontal cross-member 412 and proximate their lower ends by a lower horizontal cross-member 414. The upper cross-member 412 is suitably constructed of a steel I-beam, offset rearwardly (i.e., towards the container) from the upper ends of the vertical rails on vertical end plates 415.

Downwardly-extending pins 416 are mounted proximate the ends of cross-member 412, and may be attached to the lower flange of the I-beam by bolts 418 or other removable fasteners. Retractable horizontally extending locking pins 420 are mounted proximate the lower ends of the side rails 412a-b, being spaced rearwardly of the side rails on mounting plates 422 so as to be aligned with upper pins 416 in a plane rearward of and parallel to that of the main frame members. As with the embodiment described above, the vertical pins 416 are configured and located to be receivable in the top openings of the upper corner castings of an ISO container, while the horizontal pins 422 are configured and located to be receivable in the side openings of the lower corner castings. The lift assembly 400 can thus be installed on the end of the shipping container, using a forklift or other machine in a manner similar to that described above to set the frame down on the end of the container so that the vertical pins 416 engage the upper corner castings, and then extending the horizontal pins 420 to engage the lower corner castings. Also similar to above, the side rails 410a-b and cross-member 412 are dimensioned to define an opening 424 that is sized to receive the end of an ISO container with clearance to permit the doors of the container to be opened therethrough. The lower horizontal cross-member 414 is located below opening 424, and in addition to being a structural member of the frame section serves to house the drive mechanism of the assembly as will be described below.

Figure 17A:
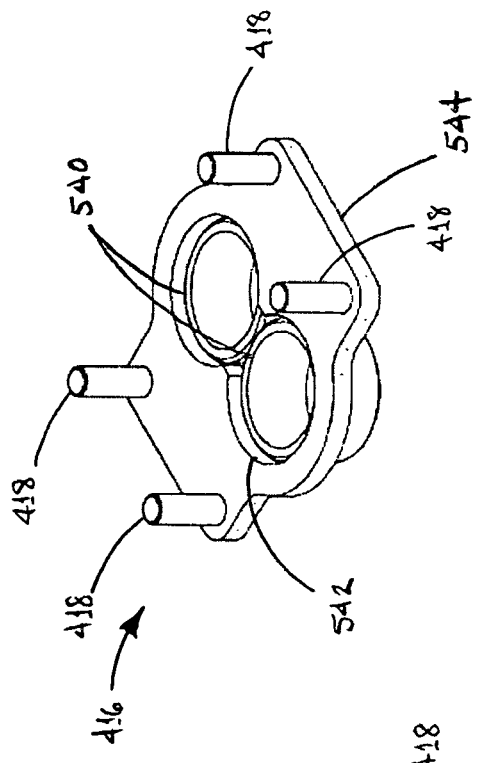
FIGS. 17A-17B are, respectively, enlarged perspective views of the lower and upper sides of the upper pin members that are mounted to the frame of the portable lift assembly of FIGS. 15-16, that extend downwardly to engage cooperating openings in the corner castings of containers when the assembly is set thereon.
Figure 17B:
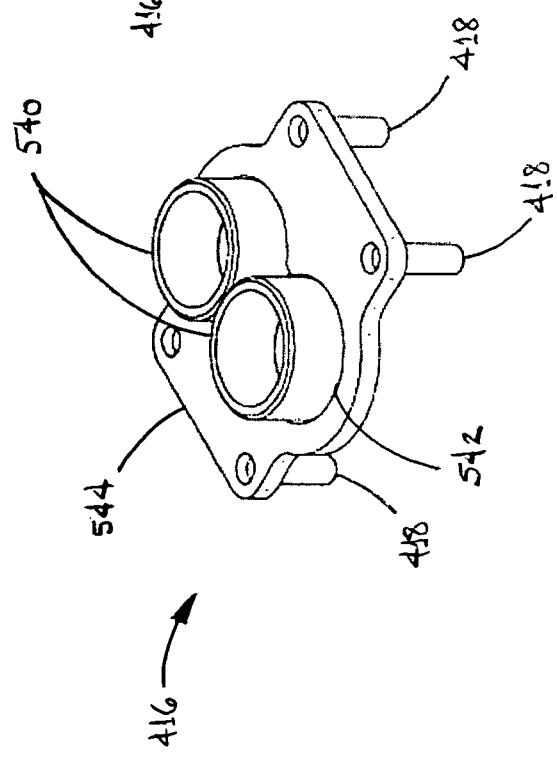
Figure 18:
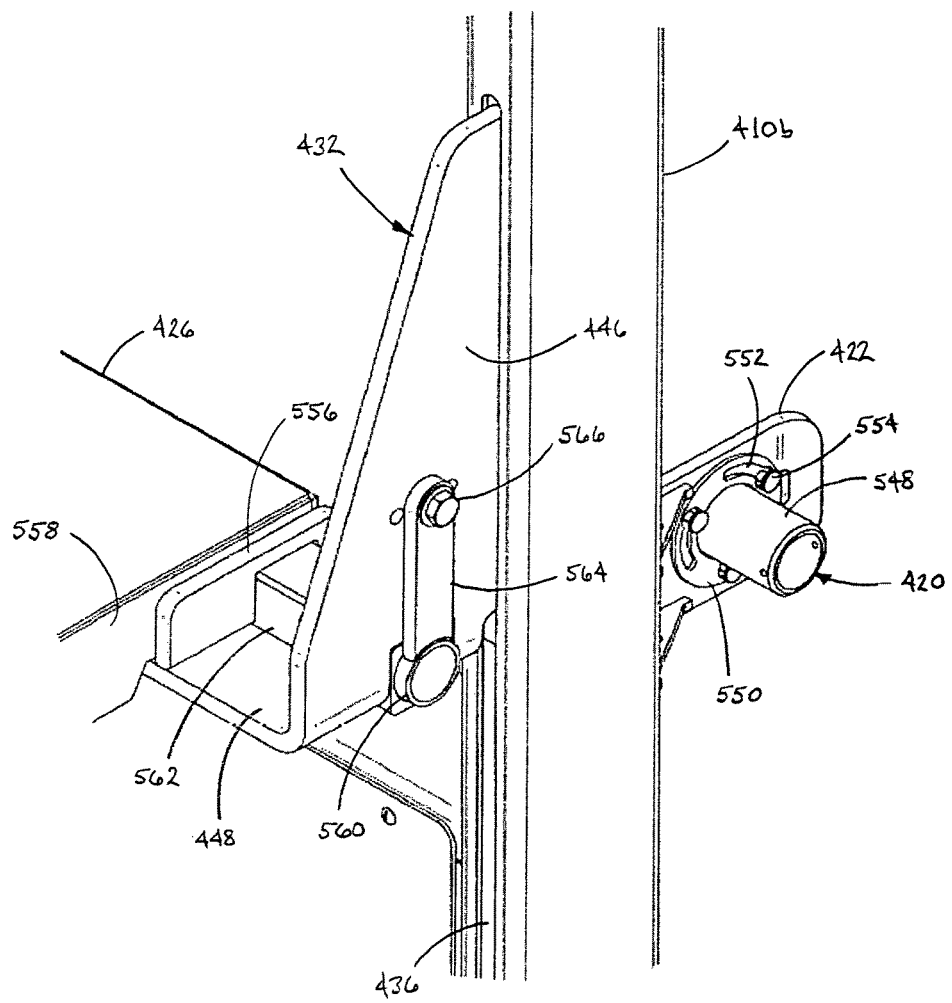
FIG. 18 is an enlarged perspective view of one of the retractable pin members mounted to the lower sides of the frame of the portable lift assembly of FIGS. 15-16, that are inwardly extensible so as to engage cooperating openings in the lower corner castings of containers when the lift assembly is set thereon.
Figure 25:
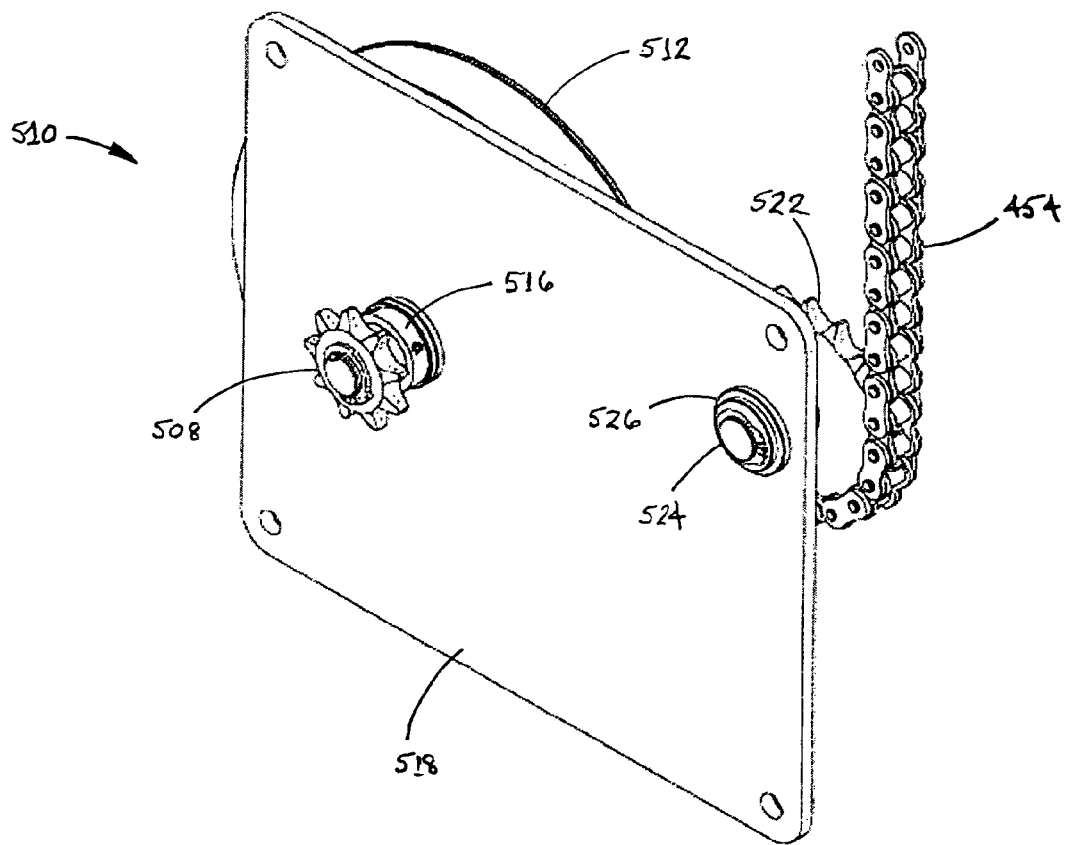
FIG. 25 is a rear perspective view of the reel assembly of FIG. 21A, showing the sprocket on the rear of the assembly that engages the horizontal chain of the drive mechanism.
Figure 26:
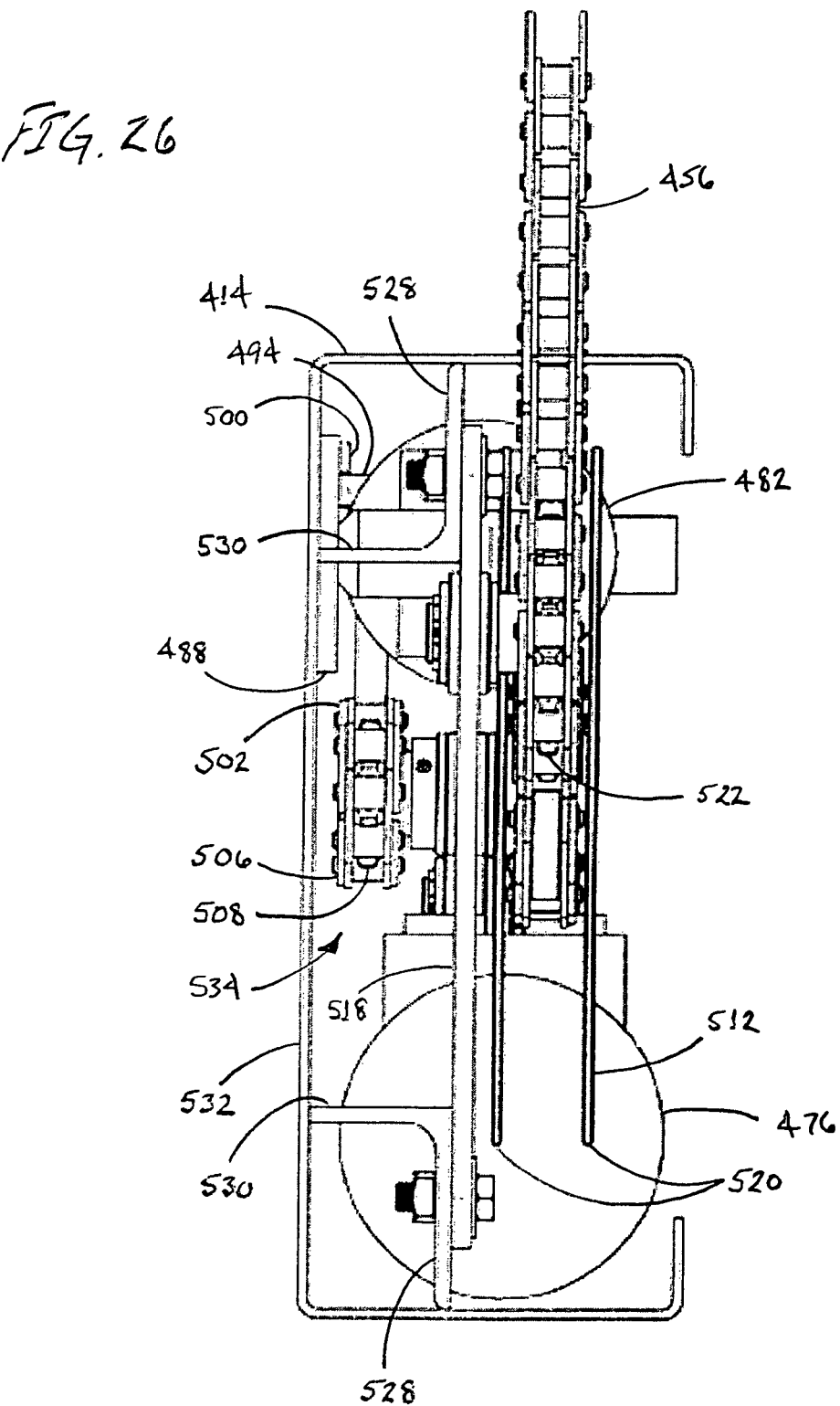
FIG. 26 is a left end elevational view of the drive mechanism and cross-member of FIG. 18B, showing the manner in which the drive mechanism is supported and housed within the latter.

FIGS. 17A, 17B and 18 show the construction of the pin members in greater detail. As can be seen in FIGS. 17A-17B, the upper pin members 416 may be constructed of a pair of short pipe stubs 540 mounted together and parallel to one another in a somewhat figure eight-shaped configuration, in a cooperating opening 542 in a base plate 544. The two pipe stubs are sized in diameter such that in the figure-eight relationship the protruding ends of the pipe stubs will conform closely to the interior of the generally oval openings of the corner castings, forming a stable engagement therewith that prevents shifting or other movement of the frame section on the end of the container. The pipe stubs extend perpendicular to the base plate so as to depend vertically from the lower flange of the upper beam 412 of the frame section when the pin member is mounted thereto as shown in FIG. 16. In the illustrated embodiment, the ends of the pipe stubs 540 are threaded into the opening 542 of the base plate, allowing the stabs to be cahnged out when worn; in other embodiments, however, the pipe stubs may be welded or otherwise permanently affixed to base plate, or a oval or otherwise suitably shaped casting or other piece may form the vertical body of the pin member, and still further the pins may be permanently mounted or formed as a part of the upper member of the frame itself.

FIG. 18 in turn shows in greater detail the structure of the lower, horizontal pin members 420. As can be seen therein, each of the lower pin members includes a cylindrical body, suitably formed of length of pipe, that is rotatably and slidably received in a cooperating bore (not shown) in plate 422 that extends rearwardly from the vertical side rail of the frame section. The inboard ends 546 of the pins (see FIG. 15) project inwardly from the plates 422 to engage the openings in the lower corner castings, while the outboard ends 548 project outwardly from the plates to form hand grips that allow the pins to manually rotated and pulled/pushed. An annular flange 550 is mounted partway along the length of the cylindrical pin so as to bear against the outboard surface of the associated plate 422, and includes arcuate key hole slots 552 that receive cooperating retaining pins 554 that projects from plate 422. In order to retract a pin an operator grasps the projecting outer end 548 and rotates the pin member (counter-clockwise in the illustration of FIG. 18) until the enlarged openings at the ends of the key hole slots move into register with the heads of pins 554 so that flange 550 is released to move outwardly, and then pulls the pin so as to retract the end 546 through the bore in plate 422. Then, to extend the pin member into the opening of the cooperating corner casting the operator reverses the procedure, pushing the pin member inwardly so that its inner end 546 enters the opening of the corner casting and then turning the pin (clockwise in FIG. 18) so that the narrow portions of the key hole slots move under the heads of the retaining pins 554 to maintain the pin member in the extended position. The mechanism is thus simple and convenient to operate, as well as being durable and einexpensive to construct, however it will be understood that other embodiments may employ different forms of manual or automatic extension/retraction mechanisms, such as spring loaded pins or electrically or hydraulically actuated mechanisms for example.

The lift assembly 400 can therefore be placed on the end of the ISO shipping container, using a forklift or similar apparatus as described above, by setting the frame of the assembly down on the end of the container so that the vertical pins 416 engage the upper corner castings and then extending the horizontal pins 420 to engage the lower corner castings.

The side rails 410a-b and upper cross-member 412 of the frame section 402 of the assembly are dimensioned to define a through opening 424 that is sized to receive the end of an ISO container and to allow the access doors to be opened therethrough. The lower horizontal cross-member 414 is located below through opening 424, and in addition to forming a structural member of the frame section serves to house the drive mechanism of the assembly, as will be described below.

As can be seen with further reference to FIG. 15, the platform section 414 of the assembly includes a load platform 426, having in this example a horizontal main deck 428 and a ramp 430 at the outer edge that facilitates rolling loads on and off the platform when on the ground. Platform 426 is cantilevered forwardly, in a direction away from the end of the container, on support brackets 432, the rearward edge 434 of the platform being positioned forwardly by the brackets so as to clear the lower cross-member 414 as the platform is raised and lowered. Movement of brackets 432 is in turn accommodated by vertical slots 436 in the lower ends of the side rails 410a-b.

As can be seen with reference to FIGS. 16A-16E, the side rails 410a-b each include a full-height tubular outer leg 440 and a shorter inner leg 442 that moves vertically within the outer leg. The inner and outer legs are suitably constructed of rectangular cross-section tubing, the inner leg being sufficiently smaller in cross-section to fit within the interior of the outer leg with clearance for sliding movement. The rectangular tubing is preferably aligned with the long dimension in a front-to-back direction as shown, to aid in supporting loads resulting from weight on the lift platform. Bearing strips 444, suitably formed of UHMWPE, Delrin™, nylon, PTFE or other hard, low friction material, are mounted along the front and back walls of the inner leg 442 to form a sliding engagement with the corresponding interior walls of the outer leg, to provide a low-friction interface while bearing tortional loads imparted to the inner leg by the cantilevered platform.

Brackets 432 are mounted to the lower ends of inner legs 442, and include flanges 446 that project forwardly through the slots 436 in the outer legs and lateral portions 448 that support the edges of the load platform 426. As can better be seen in FIG. 18, guide plate 556 extend upwardly from the support portions 448 of the brackets and react against the outboard edges 558 of the load platform so as to help center and align the latter within the frame section of the assembly. A tubular torsion bar 560 passes through cooperating bores in guide blocks 562 mounted on brackets 432, and horizontally across the rearward edge of platform 426. The ends of the torsion bar, outboard of guide blocks 562, include laterally extending arms 564 that are anchored to the vertical flanges 446 of brackets 432 by bolts 566. The middle portion of the torsion bar is in turn joined to the platform 426 by a centrally located clamp 568, such that when the platform is lowered the torsion bar biases the latter upwardly to aid in manually raising the platform to the vertical, folded orientation shown in FIG. 16. The torsion bar provides a durable and economically constructed mechanism that aids in manual lifting of the platform, however it will be understood that lifting aids may not be included in all embodiments, and furthermore that other forms of lifting aids may be employed, such as springs or electrically or hydraulically driven mechanisms for example.

As noted above, lift assembly 400 employs a chain-and-sprocket system to raise and lower the load platform. As can be seen in FIGS. 16A-16B, the lower end portions of the tubular legs 440 each include an opening 450 through which the actuating chain is routed, over an idler sprocket that projects partway through the opening. A slot 452 $f$ in the side of the inner leg allows the chain to enter the interior of the inner leg while also accommodating movement of the inner leg relative to the sprocket.

A first vertical run 454 of the actuating chain (see FIG. 16C) extends upwardly from the idler sprocket through the interior of inner leg 442, and from the open top of the inner leg through the interior of the outer leg 440 to the masthead sprocket assembly 456 (the masthead assembly being shown with its cover in place in FIG. 16A and with the cover removed in FIGS. 16B-C), that reverses the direction of the chain so as to form a second vertical leg 458 that extends back down through the interior of leg 440. As can better be seen in FIG. 16C, the masthead assembly includes lower and upper horizontal axis sprockets 460, 462 supported by a base plate 464. The sprockets are laterally offset, the lower sprocket 460 serving to align the first vertical run 454 of the chain and also to maintain the chain in engagement with the upper sprocket, and the upper sprocket 462 routing the second run 458 of the chain back down in the vertical direction. As is shown in FIGS. 16D-16E, the lower end of the second vertical run 458 of the chain is attached to the upper end of a rod 466 that in turn extends downwardly through opening 468 to a connection (not shown) inside leg 442. Consequently, retracting the downward vertical run of the actuating chain raises the inner leg, together with the load platform that is mounted thereon, while extending run 458 lowers the inner leg and platform.

FIGS. 17A-17B show the mast head chain-and-sprocket assembly in additional detail, and in particular illustrate the manner in which the staggered sprockets 460, 462 cooperate to maintain the two chain runs 454, 458 in parallel, closely spaced relationship, so that they are both able to extend vertically through the internal passage of leg 442. The figures also show threaded posts 470 by which the cover 472 is mounted to base plate 464, the latter in turn being mounted to the upper end of the vertical leg.

As noted above, power to raise and lower the load platform is supplied from the drive section 403, that is housed within the lower horizontal cross-member 414 of the frame. As can be seen in FIGS. 18A-18B, the cross-member may be formed of a C-shaped channel having a forward-facing opening that is closed by a removable access cover 474. A hydraulic pump 476 driven by an electric motor 478 is mounted in the lower part of the channel, with power being supplied to the motor via a cord (not shown) from a battery pack, or from electric mains or other suitable sources. Pressure from pump 476 is supplied via hydraulic lines (not shown) to a hydraulic cylinder 480 having a housing 482 and extensible/retractable rod 484 (see FIG. 19A), mounted horizontally in the upper part of the channel beam that forms the cross-member.

For purposes of clarity FIGS. 19A-19B show the drive mechanism without the structural cross-member. As can be seen therein, the distal end of the housing of the hydraulic cylinder 480 is connected by a pivotable yoke 486 to a pad 488, the last being mounted to the web of the cross-member so that the housing of the hydraulic cylinder is held stationary relative thereto. A chain connector 490 is mounted to the cylinder rod 484 at the opposite end from the stationary mounting pad 488. As can better be seen in FIG. 20C, the chain connector is somewhat T-shaped in end view, having a generally horizontal upper plate 492 with a rearwardly projecting edge 494, and a generally vertical plate 496 having a chain attachment portion 498 along its lower edge, the end of rod 484 being mounted in the angle between the horizontal and vertical plates. The projecting rearward edge 494 of the upper plate is received in a channel-shaped guide track 500 mounted to the frame member, that supports and guides the end of the piston rod as it is extended and retracted. The lower edge 498 of the vertical plate 496 is connected to the horizontal upper run 502 of the drive chain, using a row of openings 504 in the attachment portion 498. Thus, as the piston rod 484 of the hydraulic cylinder is extended and retracted the upper run 502 of the drive chain is drawn first one way and then the other.

As can be seen in the rear view of FIG. 19B, the upper and lower horizontal runs 502, 506 of the drive chain extend across the drive section, generally parallel to the hydraulic cylinder, in an area at the back of the mechanism towards the vertical web of the cross-member. At the ends, the horizontal runs 502, 506 are routed over sprockets 508 on the rear of first and second reel assemblies 510, 510', the reel assemblies being identical but inverted in orientation. As is shown in FIGS. 21A-21B and also FIG. 22, each of the assemblies 510, 510' includes a chain reel 512 that is driven by sprocket 508, via a horizontal shaft 514 that passes through a bushing 516 in plate 518. As can be seen in FIG. 21B, which shows the chain reel with the front side plate 520 removed, each of the reels 512 includes a spiral sprocket 521 having the end of one of the actuating chains connected thereto, so that in response to the chain reel being rotated in a first direction (clockwise in FIG. 21B) the chain is drawn in and wound spirally in the area between the side plates 520 of the reel, and in response to the reel being rotated in the opposite direction the chain is unwound and paid out.

From the chain reel, the actuating chain is routed under an idler sprocket 522, the axle 524 of the idler sprocket being supported in a second bushing 526 in mounting plate 518. With the reel assembly mounted in the horizontal cross-member 414 as shown in FIG. 18B, and the cross-member mounted in the frame section as shown in FIG. 15, the outboard edge of the idler sprocket 522 protrudes through the opening 450 in the outer leg 440 (see FIG. 16B) and into the interior of the inner leg 442. From this point, the vertical run 454 of the actuating chain extends upwardly to the masthead sprocket assembly as described previously. Similarly, at the opposite end of the drive section the actuating chain is routed under the idler sprocket 522 of the inverted reel assembly 510' and the vertical run 454' of the chain is routed vertically through the inner and outer legs of the frame.

With further reference to FIG. 19C, angle brackets are mounted along the upper and lower edges of the vertical base plates 518 of the reel assemblies. As can be seen in FIG. 23, the angle brackets 528 serve to locate and support the base plates 518 and associated components within the C-channel frame member 414, the rearwardly extending flanges 530 of the angle brackets acting as stand-offs against the vertical web 532 of the channel to form a gap 534 that accommodates the sprockets 508 and chain runs 502, 506 at the rear of the drive mechanism. The components of the drive section are thereby housed compactly and protected within the lower cross-member of the frame section.

Thus, in response to actuation of the hydraulic cylinder to extend rod 484, the chain connector and the upper run 502 of the drive chain are driven in a first direction, to the right in the example of FIG. 19A. In so doing, the drive chain acts through sprockets 508 to rotate both of the chain reels in a first direction (clockwise in FIG. 19A), retracting the actuating chains under idler sprockets 522 and onto the chain reels so as to draw downwardly on the vertical legs 454, 454' of the chains. This in turn draws the other vertical legs 458 of the chains upwardly towards the masthead sprocket assemblies, thus raising the inner legs 452 and the load platform towards the elevated position that is shown in FIG. 15. Operating the hydraulic cylinder so as to retract rod 484 in turn drives the upper run 502 of the chain in the opposite direction and rotates the chain reels 512 in a reverse direction (counterclockwise in FIG. 19A), causing the reel assemblies to pay out the actuating chains and thereby lower inner legs 442 together with the load platform 426. Cargo can consequently be moved into and out of the container in a rapid and efficient manner, similar to that described above, with the weight of the assembly and loads being borne safely by the end of the container.

It will be understood that some embodiments may employ other forms of flexible tension linkages, such as cable-and-pulley systems, in place of or in combination with the chain-and-sprocket system described, or may employ other forms of actuators in place of or in combination with the hydraulic cylinder described, such as other types of linear actuators for example.

It will be appreciated that a lift assembly as described above can be economically constructed to have adequate strength to handle the cargo typically carried in such shipping containers, yet remain sufficiently light for convenient movement between separate containers and placement thereon using conventional forklifts or other readily available and comparatively low-cost equipment.

The scope of the appended claims should not be limited by particular embodiments set forth herein, but should be construed in a manner consistent with the specification as a whole.

What is claimed is:

1. A portable lift apparatus for loading and unloading a standardized intermodal shipping container having load bearing lift points formed by upper corner castings and lower corner castings at ends of said container, said upper corner castings having upwardly facing openings and said lower corner castings having outwardly facing openings, said portable lift apparatus comprising:
   a frame that is detachably mountable on an access end of a shipping container, said frame comprising:
   an upper frame member; and
   first and second upper connector members mounted on said upper frame member that releasably engage said upper corner castings on said access end of said container, said upper connector members comprising:
   downwardly extending pin members that are received vertically in said upwardly facing openings of said upper corner castings so as to form an engagement between said upper frame member and said upper corner castings whereby said frame of said lift apparatus is supported by said upper corner castings on said access end of said shipping container;
   a load platform mounted on said frame that supports cargo being loaded or unloaded from said shipping container; and
   a drive mechanism that selectively raises and lowers said load platform with said cargo supported thereon.

2. The portable lift apparatus of claim 1, wherein said frame further comprises:
   a generally horizontal upper cross-member that extends across said access end of said shipping container;
   said first and second connector members being located on said upper cross member of said frame so that said upper cross member is positioned on said upper corner castings on said access end of said shipping container when said connector members are received in said upwardly facing openings of said upper corner castings.

3. The portable lift apparatus of claim 2, wherein said frame further comprises:
   first and second vertical side rails that extend downwardly from ends of said horizontal upper cross member to define a through opening that receives said access end of said shipping container with said side rails extending down outer sides of said container.

4. The lift apparatus of claim 3, wherein said frame further comprises:
   first and second lower connector members mounted on said vertical side rails that releasably engage said outwardly facing openings of said lower corner castings on said access end of said container.

5. The portable lift apparatus of claim 2, wherein said frame further comprises first and second vertical side rails that extend downwardly from ends of said horizontal upper cross member to define a through opening and a horizontal lower cross member located below said through opening, and wherein said drive mechanism that raises and lowers said load platform comprises:
   first and second chain reels mounted to end portions of said horizontal lower member of said frame proximate said vertical side members of said frame;
   first and second actuating chains routed generally vertically on said vertical side members of said frame, each said actuating chain having a first lower end connected to one of said chain reels, a middle portion routed over at least one idler mounted to an upper portion of one of said vertical side members, and a second lower end connected to said load platform;
   a drive chain routed generally horizontally on said horizontal lower member of said frame, that interconnects said first and second chain reels so that in response to operation of said drive chain in a first direction said chain reels retract said actuating chains to raise said load platform and in response to operation of said drive chain in a second direction said chain reels payout said actuating chains to lower said load platform; and
   an actuator that drives said drive chain in said first and second directions to raise and lower said load platform.

6. The lift apparatus of claim 5, wherein said actuator that drives said drive chain in said first and second directions comprises:
   a selectively extensible and retractable hydraulic cylinder mounted generally horizontally on said horizontal lower member of said frame, said hydraulic cylinder having a first end mounted to said lower horizontal member and a second end mounted to a generally horizontal run of said drive chain.

7. The portable lift apparatus of claim 1, wherein said downwardly extending pin members of said first and second connector member:
   are contoured to conform closely to said upwardly facing openings of said upper corner castings so as to stabilize said frame on said access end of said container.

8. The portable lift apparatus of claim 7, wherein said upwardly facing openings of said upper corner castings are substantially oval in form, and said downwardly extending pin members:
   have substantially oval exteriors dimensioned to cooperate with said upwardly facing openings of said upper corner castings.

9. The portable lift apparatus of claim 8, wherein said downwardly extending pin members each comprises:
   first and second cylindrical stub members mounted in spaced, parallel relationship so as to form a figure-eight contour that defines said substantially oval exterior of said pin member.

10. The portable lift apparatus of claim 1, wherein said frame further comprises:
   first and second stop members mounted on said frame that contact said upper corner castings so as to arrest movement of said frame towards said access end of said shipping container at a point where said downwardly extending pin members are aligned vertically with said upwardly facing openings of said upper corner castings; and
   a horizontal lower cross member located below said through opening and having said drive mechanism mounted thereto.

* * * * *